US010726625B2

(12) United States Patent
Kraver

(10) Patent No.: US 10,726,625 B2
(45) Date of Patent: Jul. 28, 2020

(54) METHOD AND SYSTEM FOR IMPROVING THE TRANSMISSION AND PROCESSING OF DATA REGARDING A MULTI-USER VIRTUAL ENVIRONMENT

(71) Applicant: CCP hf., Reykjavik (IS)

(72) Inventor: Adam Kraver, Tucker, GA (US)

(73) Assignee: CCP hf., Reykjavik (IS)

(*) Notice: Subject to any disclaimer, the term of this patent is extended or adjusted under 35 U.S.C. 154(b) by 0 days.

(21) Appl. No.: 14/608,054

(22) Filed: Jan. 28, 2015

(65) Prior Publication Data
US 2016/0217615 A1   Jul. 28, 2016

(51) Int. Cl.
*G06T 19/00*   (2011.01)
*G02B 27/01*   (2006.01)
(Continued)

(52) U.S. Cl.
CPC ........ *G06T 19/006* (2013.01); *G02B 27/0172* (2013.01); *G06F 3/012* (2013.01);
(Continued)

(58) Field of Classification Search
CPC ........ G06T 15/20; G06T 3/40; G06T 19/006; H04L 43/0811; G01C 17/34; A63F 13/10;
(Continued)

(56) References Cited

U.S. PATENT DOCUMENTS 6,032,193 A   2/2000   Sullivan
6,091,410 A   7/2000   Lection et al.
(Continued)

FOREIGN PATENT DOCUMENTS

RU   2433487 C2   11/2011
RU   2536354 C2   12/2014

OTHER PUBLICATIONS

U.S. Appl. No. 14/608,047, filed Jan. 28, 2015; In re: Kraver et al., entitled *Method and System for Receiving Gesture Input via Virtual Control Objects*.
(Continued)

*Primary Examiner* — Ming Wu
(74) *Attorney, Agent, or Firm* — Alston & Bird LLP

(57) ABSTRACT

The present disclosure provides computer systems, apparatuses, computer-executable methods and one or more non-transitory computer-readable media for implementing a multi-user virtual reality environment. An example of a computer-implemented method for implementing a multi-user virtual reality environments includes receiving sensor data from a sensor at a local device, providing the sensor data to a network interface for electronic transmission to a remote device, providing the sensor data to a virtual environment engine executing on a processor of the local device, determining, by the virtual environment engine and based at least in part on the sensor data, virtual environment data related to a virtual reality environment, providing the virtual environment data to the network interface for electronic transmission to the remote device, and electronically transmitting, using the network interface, the sensor data and the virtual environment data to the remote device for use in generating a multi-user virtual environment.

20 Claims, 12 Drawing Sheets

(51) Int. Cl.
  *G09G 5/00* (2006.01)
  *G06F 3/03* (2006.01)
  *G06F 3/0481* (2013.01)
  *G06F 3/01* (2006.01)

(52) U.S. Cl.
  CPC ........ *G06F 3/0304* (2013.01); *G06F 3/04815* (2013.01); *G09G 5/003* (2013.01); *G02B 2027/0178* (2013.01); *G09G 2370/02* (2013.01)

(58) Field of Classification Search
  CPC ........... H04W 8/005; G02B 2027/0178; G02B 27/0172; G06F 3/012; G06F 3/0304; G06F 3/04815; G09G 2370/02; G09G 5/003
  See application file for complete search history.

(56) References Cited

U.S. PATENT DOCUMENTS

| | | | |
|---|---|---|---|
| 6,181,343 | B1 | 1/2001 | Lyons |
| 7,301,536 | B2* | 11/2007 | Ellenby .................. G01C 17/34 345/419 |
| 7,814,154 | B1* | 10/2010 | Kandekar ............... A63F 13/10 463/42 |
| 7,864,168 | B2 | 1/2011 | French |
| 8,059,894 | B1 | 11/2011 | Flagg et al. |
| 8,576,276 | B2 | 11/2013 | Bar-Zeev et al. |
| 8,585,476 | B2 | 11/2013 | Mullen |
| 8,687,021 | B2 | 4/2014 | Bathiche et al. |
| 8,713,450 | B2 | 4/2014 | Garbow et al. |
| 8,933,876 | B2 | 1/2015 | Galor et al. |
| 9,753,687 | B1 | 9/2017 | Cronin |
| 2003/0032484 | A1 | 2/2003 | Ohshima et al. |
| 2006/0087509 | A1 | 4/2006 | Ebert et al. |
| 2007/0110298 | A1 | 5/2007 | Graepel et al. |
| 2008/0201751 | A1* | 8/2008 | Ahmed .............. H04N 21/4312 725/109 |
| 2008/0313386 | A1* | 12/2008 | Iwasaki ............... G06F 13/1673 711/101 |
| 2009/0016255 | A1* | 1/2009 | Park ...................... H04W 8/005 370/312 |
| 2009/0141023 | A1* | 6/2009 | Shuster ..................... G06T 3/40 345/419 |
| 2009/0225074 | A1* | 9/2009 | Bates ...................... G06T 15/20 345/419 |
| 2010/0008269 | A1* | 1/2010 | Chun .................... H04L 1/1854 370/310 |
| 2010/0161859 | A1 | 6/2010 | Brandt et al. |
| 2010/0309097 | A1 | 12/2010 | Raviv et al. |
| 2011/0238794 | A1* | 9/2011 | Wu ..................... H04L 43/0811 709/220 |
| 2012/0050767 | A1* | 3/2012 | Tanaka ................. H04N 1/6033 358/1.9 |
| 2012/0105473 | A1 | 5/2012 | Bar-Zeev et al. |
| 2012/0122570 | A1 | 5/2012 | Baronoff |
| 2012/0166969 | A1* | 6/2012 | Gillo ...................... A63F 13/31 715/753 |
| 2012/0206452 | A1 | 8/2012 | Geisner et al. |
| 2012/0249416 | A1 | 10/2012 | Maciocci et al. |
| 2012/0249741 | A1 | 10/2012 | Maciocci et al. |
| 2012/0264510 | A1 | 10/2012 | Wigdor et al. |
| 2013/0042296 | A1 | 2/2013 | Hastings et al. |
| 2013/0050069 | A1 | 2/2013 | Ota |
| 2013/0117377 | A1 | 5/2013 | Miller |
| 2013/0121563 | A1 | 5/2013 | Chen et al. |
| 2013/0125027 | A1 | 5/2013 | Abovitz |
| 2013/0141419 | A1 | 6/2013 | Mount et al. |
| 2013/0162639 | A1 | 6/2013 | Muench et al. |
| 2013/0183645 | A1 | 7/2013 | Wallace et al. |
| 2013/0194164 | A1 | 8/2013 | Sugden et al. |
| 2013/0257904 | A1 | 10/2013 | Roth |
| 2013/0328762 | A1 | 12/2013 | McCulloch et al. |
| 2013/0328928 | A1 | 12/2013 | Yamagishi et al. |
| 2014/0063061 | A1 | 3/2014 | Reitan |
| 2014/0078176 | A1 | 3/2014 | Kim et al. |
| 2014/0128161 | A1 | 5/2014 | Latta et al. |
| 2014/0160162 | A1 | 6/2014 | Balachandreswaran et al. |
| 2014/0204002 | A1 | 7/2014 | Bennet et al. |
| 2014/0206443 | A1 | 7/2014 | Sharp et al. |
| 2014/0368533 | A1 | 12/2014 | Salter et al. |
| 2015/0007114 | A1 | 1/2015 | Poulos et al. |
| 2015/0016777 | A1 | 1/2015 | Abovitz et al. |
| 2015/0260990 | A1 | 9/2015 | Ueno et al. |
| 2015/0312559 | A1 | 10/2015 | Ueno et al. |
| 2015/0352437 | A1 | 12/2015 | Koseki et al. |
| 2016/0012297 | A1 | 1/2016 | Kanga et al. |
| 2016/0299569 | A1 | 10/2016 | Fisher et al. |
| 2016/0345871 | A1 | 12/2016 | Matsumoto et al. |
| 2017/0123492 | A1 | 5/2017 | Marggraff et al. |
| 2017/0169616 | A1 | 6/2017 | Wiley et al. |
| 2017/0235462 | A1 | 8/2017 | Zhou |
| 2018/0095616 | A1 | 4/2018 | Valdivia et al. |
| 2018/0160881 | A1 | 6/2018 | Okabe et al. |
| 2018/0174366 | A1 | 6/2018 | Nishibe et al. |
| 2018/0366090 | A1 | 12/2018 | Shatzki et al. |
| 2019/0258320 | A1 | 8/2019 | Yang et al. |

OTHER PUBLICATIONS

U.S. Appl. No. 14/608,067, filed Jan. 28, 2015; In re: Kraver, entitled *Method and System for Providing Virtual Display of a Physical Environment*.

LaViola, Jr. J. J., *Bringing VR and Spatial 3D Interaction to the Masses Through Video Games*, Graphically Speaking, IEEE Computer Society (Sep.-Oct. 2008) 10-15.

Adobbati, R. et al., *Gamebots: A 3D Virtual World Test-Bed for Multi-Agent Research*, Agents '01, ACM (2001) 6 pages.

Di Blas, N. et al., *The SEE Experience: Edutainment in 3D Virtual Worlds*, ERIC, IR 058 816, ED 482 149, Papers Museum & The Web 2003 (2003) 14 pages.

Kato, H. et al., *Virtual Object Manipulation on a Table-Top AR Environment*, Proceedings of the International Symposium on Augmented Reality (ISAR 2000) 9 pages.

Ohshima, T. et al., *$AR^2$ Hockey: A Case Study of Collaborative Augmented Reality*, Proc. IEEE Virtual Reality Annual International Symposium (VRAIS'98) (Mar. 1998) 268-275, 8 pages.

Piekarski, W. et al., *ARQuake: The Outdoor Augmented Reality Gaming System*, Communications of the ACM, vol. 45, No. 1 (Jan. 2002) 36-38.

Szalavari, Z. et al., *Collaborative Gaming in Augmented Reality*, ACM Symposium on Virtual Reality Software and Technology (1998) 1-19.

Widder, B., *Best Augmented Reality Apps* [online] [retrieved Sep. 26, 2014]. Retrieved from the Internet: <URL: http://www.digitaltrends.com/mobile/best-augmented-reality-apps/>. (dated Mar. 14, 2014) 5 pages.

Non-Final Office Action for U.S. Appl. No. 14/608,047, dated Jul. 15, 2016.

Final Office Action for U.S. Appl. No. 14/608,067 dated Sep. 14, 2016, 31 pages.

Final Office Action for U.S. Appl. No. 14/608,047 dated Dec. 30, 2016, 17 pages.

Office Action for U.S. Appl. No. 14/608,067 dated May 9, 2017.

Notice of Allowance for U.S. Appl. No. 14/608,047 dated Aug. 23, 2017, 9 pages.

Office Action for U.S. Appl. No. 14/608,067 dated Feb. 12, 2018.

Non-Final Office Action for U.S. Appl. No. 14/608,067 dated Oct. 4, 2018, 40 pages.

Office Action for European Application No. 16 708 207.2 dated Nov. 23, 2018, 8 pages.

Office Action for U.S. Appl. No. 15/815,053 dated Apr. 15, 2019.

Office Action for European Application No. 16 704 049.2 dated Feb. 25, 2019, 9 pages.

Villar, Jacobo Rodriguez. "OpenGL Shading Language Course: Chapter 1—Introduction to GLSL." TyphoonLabs, TyphoonLabs' GLSL Course, 2004, 29 pages.

(56) References Cited

OTHER PUBLICATIONS

Non-Final Office Action for U.S. Appl. No. 14/608,067, dated Apr. 20, 2016.
International Search Report and Written Opinion for International Patent Application No. PCT/IB2016/050408 dated Apr. 11, 2016, 14 pages.
International Search Report and Written Opinion for International Patent Application No. PCT/IB2016/050410 dated Apr. 20, 2016, 14 pages.
International Search Report and Written Opinion for International Patent Application No. PCT/IB2016/050411 dated May 2, 2016, 14 pages.
Office Action for Russian Application No. 2017130355 dated Jul. 26, 2019, 17 pages including English translation.
Office Action for Russian Application No. 2017130354 dated Sep. 3, 2019, 12 pages Including English translation.
Office Action for Russian Application No. 2017130356 dated Sep. 3, 2019, 10 pages Including English translation.
Final Office Action for U.S. Appl. No. 14/608,607 dated Jun. 3, 2019.
Non-Final Office Action for U.S. Appl. No. 15/815,053 dated Feb. 27, 2020.
Notice of Allowance for U.S. Appl. No. 14/608,067 dated Mar. 18, 2020.

* cited by examiner

METHOD AND SYSTEM FOR IMPROVING THE TRANSMISSION AND PROCESSING OF DATA REGARDING A MULTI-USER VIRTUAL ENVIRONMENT

TECHNOLOGICAL FIELD

Example embodiments of the present invention relate generally to virtual reality interfaces and, more particularly, to methods, systems, apparatuses, and computer readable media for implementing shared virtual reality environments across multiple devices.

BACKGROUND

Advances in technology have resulted in consumer electronics becoming more and more powerful. In particular, advances in display, graphics, processor, network, and sensor technology have provided technological breakthroughs that have made it feasible to mass produce and market devices capable of providing a virtual reality (VR) experience to consumers. In this regard, problems and challenges in current implementations of VR interfaces have been identified by the inventors, and solutions to these problems and challenges are implemented in exemplary embodiments.

BRIEF SUMMARY

Various embodiments of the present invention are directed to improved apparatuses, methods, and computer readable media for providing a virtual reality interface. In accordance with one exemplary embodiment, a computer-executable method is provided for implementing a multi-user virtual reality environment. The method includes receiving sensor data from a sensor at a local device, providing the sensor data to a network interface for electronic transmission to a remote device, providing the sensor data to a virtual environment engine executing on a processor of the local device, determining, by the virtual environment engine and based at least in part on the sensor data, virtual environment data related to a virtual reality environment, providing the virtual environment data to the network interface for electronic transmission to the remote device, and electronically transmitting, using the network interface, the sensor data and the virtual environment data to the remote device for use in generating a multi-user virtual environment.

The network interface may include at least two separate network connections to the remote device, and each of the sensor data and the virtual environment data may be transmitted via a different connection of the at least two separate network connections. The method may include post-processing the sensor data prior to transmission to the remote device. Post-processing may include at least one of filtering the sensor data, smoothing the sensor data, cropping the sensor data, or identifying the presence of at least one object within the sensor data. The sensor data may include at least one frame of data received from a sensor. The sensor data may include a set of mask data identifying one or more pixels within the at least one frame of data that are associated with at least one object. The sensor data may include cached background data identifying the presence of at least one object not visible within the at least one frame of data. The sensor data may include sensor configuration data indicating at least one configuration parameter of the sensor.

According to another exemplary embodiment, another computer-implemented method for implementing a multi-user virtual reality environment is provided. The method includes receiving, at a local sensor interface, a first set of sensor data from a network interface, receiving a second set of sensor data from a local sensor by the local sensor interface, providing, by the local sensor interface, the first set of sensor data and the second set of sensor data to a local virtual environment engine executing on a processor, generating a multi-user virtual environment based in least in part on both the first set of sensor data and the second set of sensor data, and providing instructions to a display device to display at least a portion of the multi-user virtual environment. The method also may include receiving a set of virtual environment data from the remote device via the network interface, and verifying the set of virtual environment data based at least in part using the first set of sensor data. The method may include using the first set of sensor data to generate a virtual representation of a user of the remote device, and presenting the virtual representation of the user of the remote device within the multi-user virtual environment. The first set of sensor data further may include object mask data, and the method may also include determining a presence of a use of the remote device within the first set of sensor data based at least in part on the object mask data. The method may further include applying at least one post-processing operation to the second set of sensor data, but not the first set of sensor data. The first set of sensor data may include at least one parameter indicating the first set of sensor data was post-processed prior to transmission to the local device. The at least one post-processing operation may include a smoothing operation, a filtering operation, or a compression operation. The display device may be a head-mounted display.

Further embodiments provide a non-transitory computer-readable storage medium comprising instructions for implementing a multi-user virtual reality environment. When the instructions are executed by a processor, the processor is configured for receiving sensor data from a sensor at a local device, providing the sensor data to a network interface for electronic transmission to a remote device, providing the sensor data to a virtual environment engine executing on a processor of the local device, determining, by the virtual environment engine and based at least in part on the sensor data, virtual environment data related to a virtual reality environment, providing the virtual environment data to the network interface for electronic transmission to the remote device, and electronically transmitting the sensor data and the virtual environment data to the remote device for use in generating a multi-user virtual environment.

The network interface may include at least two separate network connections to the remote device, and each of the sensor data and the virtual environment data may be transmitted via a different connection of the at least two separate network connections. The instructions may configure the processor for post-processing the sensor data prior to transmission to the remote device. Post-processing may include at least one of filtering the sensor data, smoothing the sensor data, cropping the sensor data, or identifying the presence of at least one object within the sensor data. The sensor data may include at least one frame of data received from a sensor. The sensor data may include a set of mask data identifying one or more pixels within the at least one frame of data that are associated with at least one object. The sensor data may include cached background data identifying the presence of at least one object not visible within the at least one frame of data. The sensor data may include sensor configuration data indicating at least one configuration parameter of the sensor.

According to another exemplary embodiment, a non-transitory computer-readable storage medium comprising instructions for implementing a multi-user virtual reality environment is provided. The instructions, when executed by a processor, configure the processor for receiving, at a local sensor interface, a first set of sensor data from a network interface, receiving a second set of sensor data from a local sensor by the local sensor interface, providing, by the local sensor interface, the first set of sensor data and the second set of sensor data to a local virtual environment engine executing on a processor, generating a multi-user virtual environment based in least in part on both the first set of sensor data and the second set of sensor data, and providing instructions to a display device to display at least a portion of the multi-user virtual environment.

The instructions may include receiving a set of virtual environment data from the remote device via the network interface, and verifying the set of virtual environment data based at least in part using the first set of sensor data. The instructions may include using the first set of sensor data to generate a virtual representation of a user of the remote device, and presenting the virtual representation of the user of the remote device within the multi-user virtual environment. The first set of sensor data may include object mask data, and the instructions may include determining a presence of a use of the remote device within the first set of sensor data based at least in part on the object mask data. The instructions may include applying at least one post-processing operation to the second set of sensor data, but not the first set of sensor data. The first set of sensor data may include at least one parameter indicating the first set of sensor data was post-processed prior to transmission to the local device. The at least one post-processing operation may include a smoothing operation, a filtering operation, or a compression operation. The display device may be a head-mounted display.

According to another embodiment, an apparatus for implementing a multi-user virtual reality environment is provided. The apparatus includes means for receiving sensor data from a sensor at a local device, means for providing the sensor data to a network interface for electronic transmission to a remote device, means for providing the sensor data to a virtual environment engine executing on a processor of the local device, means for determining, by the virtual environment engine and based at least in part on the sensor data, virtual environment data related to a virtual reality environment, means for providing the virtual environment data to the network interface for electronic transmission to the remote device, and means for electronically transmitting, using the network interface, the sensor data and the virtual environment data to the remote device for use in generating a multi-user virtual environment.

According to yet another embodiment, another apparatus for implementing a multi-user virtual reality environment is provided. The apparatus includes means for receiving a first set of sensor data from a network interface, means for receiving a second set of sensor data from a local sensor, means for providing the first set of sensor data and the second set of sensor data to a local virtual environment engine, means for generating a multi-user virtual environment based in least in part on both the first set of sensor data and the second set of sensor data, and means for providing instructions to a display device to display at least a portion of the multi-user virtual environment.

According to further embodiments, a system for implementing a multi-user virtual reality environment is provided. The system includes sensor interface circuitry configured to receive sensor data from a sensor at a local device, provide the sensor data to a network interface for electronic transmission to a remote device, and provide the sensor data to a virtual environment engine executing on a processor of the local device. The system also includes virtual environment state management circuitry configured to determine, based at least in part on the sensor data, virtual environment data related to a virtual reality environment, and provide the virtual environment data to the network interface for electronic transmission to the remote device. The system also includes the network interface, configured to electronically transmit the sensor data and the virtual environment data to the remote device for use in generating a multi-user virtual environment.

The network interface may include at least two separate network connections to the remote device, and each of the sensor data and the virtual environment data may be transmitted via a different connection of the at least two separate network connections. The sensor interface circuitry may be further configured to post-process the sensor data prior to transmission to the remote device. Post-processing may include at least one of filtering the sensor data, smoothing the sensor data, cropping the sensor data, or identifying the presence of at least one object within the sensor data. The sensor data may include at least one frame of data received from a sensor. The sensor data may include a set of mask data identifying one or more pixels within the at least one frame of data that are associated with at least one object. The sensor data may include cached background data identifying the presence of at least one object not visible within the at least one frame of data. The sensor data may include sensor configuration data indicating at least one configuration parameter of the sensor.

Another exemplary embodiment provides another system for implementing a multi-user virtual reality environment. The system includes sensor interface circuitry configured to receive a first set of sensor data from a network interface, receive a second set of sensor data from a local sensor, and provide the first set of sensor data and the second set of sensor data to a local virtual environment engine executing on a processor. The system also includes virtual environment state management circuitry configured to generate a multi-user virtual environment based in least in part on both the first set of sensor data and the second set of sensor data, and provide instructions to a display device to display at least a portion of the multi-user virtual environment. The virtual environment state management circuitry may be further configured to receive a set of virtual environment data from the remote device via the network interface, and verify the set of virtual environment data based at least in part using the first set of sensor data. The virtual environment state management circuitry may also be configured to use the first set of sensor data to generate a virtual representation of a user of the remote device, and present the virtual representation of the user of the remote device within the multi-user virtual environment. The first set of sensor data may include object mask data, and the sensor interface ircuitry may be configured to determine a presence of a use of the remote device within the first set of sensor data based at least in part on the object mask data. The sensor interface circuitry may be configured to apply at least one post-processing operation to the second set of sensor data, but not the first set of sensor data. The first set of sensor data may include at least one parameter indicating the first set of sensor data was post-processed prior to transmission to the local device. The at least one post-processing operation may include a smoothing operation, a filtering operation, or a compression operation. The display device may be a head-mounted display.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
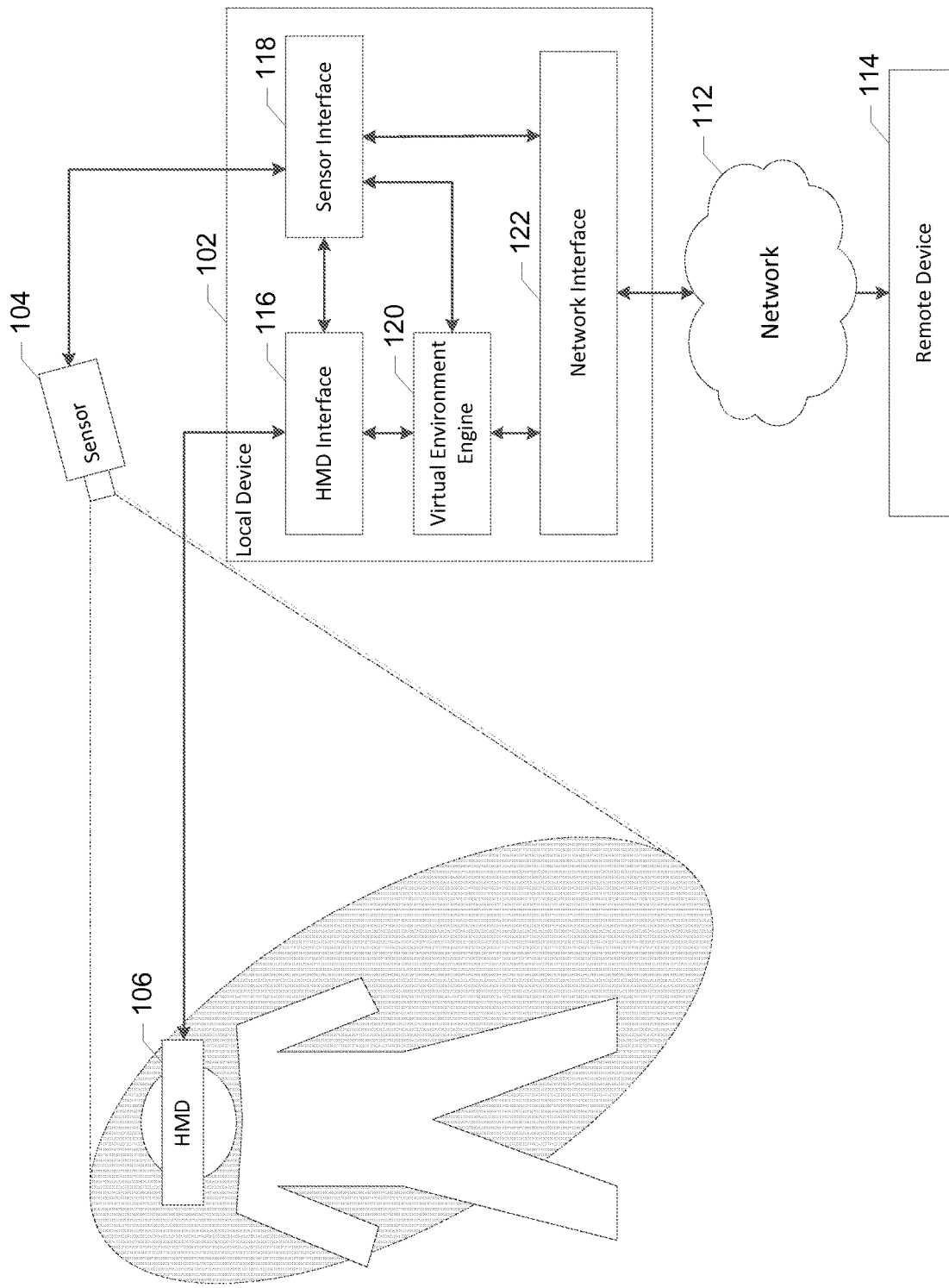
FIG. 1 is a block diagram illustrating a system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for providing a multiplayer virtual reality (VR) environment. In particular, embodiments offer improved techniques for capturing, processing, compressing, and transmitting sensor data and virtual environment data.

Glossary of Terms

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to electronic data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the terms "head-mounted display" and "HMD" are intended to refer to any display device that is attached, mounted, projects to, or otherwise provides an image on a surface that remains at a fixed position with respect to a user's viewing angle or line of vision. The term head-mounted display is intended to also include any other peripheral electronics and functionality that may be provided in conjunction with such a device. For example, a head-mounted display may include speakers, headphones, or other electronic hardware for audio output, a plurality of display devices (e.g., the use of two display devices, one associated with each of the user's eyes, to enable a stereoscopic, three-dimensional viewing environment), one or more position sensors (e.g., gyroscopes, global positioning system receivers, and/or accelerometers), beacons for external sensors (e.g., infrared lamps), or the like. Example head-mounted displays include the Oculus Rift™ manufactured by Oculus VR, the HMZ-T3W manufactured by Sony Corp., and the like.

As used herein, the term "virtual environment" is intended to refer a simulated environment with one or more objects that are projected onto or otherwise displayed to a user using an HMD in a manner such that the HMD provides the user with the sensation of being present or immersed within the virtual environment as if the virtual environment physically exists around the user. The term "virtual environment" is offered in contrast to the term "physical environment", which relates to an actual physical space.

The term "virtual environment state" is intended to refer to electronic data describing the virtual environment. The virtual environment state includes data sufficient to define a set of positions or locations of one or more objects associated with that virtual environment. It should be understood that the virtual environment state may be stored in a variety of data structures and/or formats. In some embodiments, the virtual environment state may be maintained by a "virtual environment engine" that tracks the location, status, and other attributes of objects within the virtual environment. The virtual environment engine may also manage interactions between objects within the virtual environment, such as by controlling trigger conditions, user inputs, and other events that result in changes to the virtual environment or objects therein. In some embodiments, the virtual environment engine may act in conjunction with a graphics device, renderer, or other hardware and software for generating a visual display of the virtual environment.

Although the virtual environment state may typically include an n-dimensional set of coordinates (typically three dimensions) that at least partially correspond to a given physical environment, it should be appreciated that a given virtual environment may not directly correspond to a physical environment. For example, a given virtual environment may allow a user or other objects to change position, change in size, change in shape, or the like in the virtual environment without a corresponding change or interaction in a physical environment. A given virtual environment may also map to a portion of a given physical environment (e.g., limited to an area of the physical environment visible to one or more sensors), and vice-versa (e.g., a limited portion of the virtual environment mapping to a physical environment, with user movement in the physical environment constrained to effecting changes in the limited portion of the virtual environment).

Objects that exist in the physical world may be included in the virtual environment as virtual representations of physical objects, and the term virtual environment should be understood not to exclude such virtual representations. For example, a sensor may detect the presence of a physical object in the physical environment around the user, and create a virtual object within the virtual environment corresponding to the detected physical object. The user may then be able to perceive the presence of the physical object by viewing the virtual object at a position in the virtual environment that corresponds to the position of the physical object in the physical environment.

The term "physical environment state" should be understood to refer to electronic data indicating the known or believed location of physical objects. The physical environment state is based at least in part upon data received from one or more sensors. In some embodiments, the physical environment state is also based on other data, such as derived from previous snapshots of the physical environment state, data from interface devices other than sensors (e.g., a computer keyboard or mouse), or the like.

The term "augmented environment" should be understood to refer to a combined environment including the physical environment and elements of the virtual environment. It should be noted that an augmented environment including elements of the physical environment (e.g., a video or photo image of a physical environment overlaid with virtual elements) is understood to be separate and distinct from a virtual environment that includes virtual elements that correspond to physical objects. For example, a digital photograph overlaid with tags or labels would be an augmented environment, while a system that detects the presence of a user, replaces the user with a virtual three-dimensional model, and then inserts the three-dimensional model into a virtual environment would not be an augmented environment, since the latter example uses entirely virtual constructs.

The term "sensor data" should be understood to refer to data received from one or more sensors that monitor a physical environment. Sensor data may include unprocessed data, such as raw data received directly from a sensor, sensor device driver, or the like, and processed data, such as raw data that is smoothed or filtered, or object data that is derived from multiple sets of raw sensor data (e.g., data derived from a multiple frames of captured data).

The term "virtual environment data" should be understood to refer to data relating to a virtual environment state. The use of the term virtual environment data should be understood to be separate and distinct from the term sensor data, such that data which qualifies as sensor data necessarily is not virtual environment data, and vice-versa. Typically, virtual environment data is provided by a virtual environment engine, while sensor data is provided by a sensor interface, though it should be appreciated that in some embodiments sensor data may be provided by a virtual environment engine, such as where the virtual environment engine provides sensor data as a pass-through from the sensor interface. Sensor data and virtual environment data may be differentiated in that sensor data does not require accessing of the virtual environment state, while virtual environment data necessarily requires access to the virtual environment state.

Overview

Embodiments of the presently disclosed invention generally describe novel systems, methods, and devices for implementing a multiplayer virtual environment. Advances in electronics miniaturization, decreases in display costs, and increases in graphics processing power have made it practical for consumers to obtain devices capable of providing a virtual reality experience. In particular, consumers now have the ability to obtain reasonably priced head-mounted devices (HMDs) that provide a stereoscopic three-dimensional visual experience. Many such devices also include internal accelerometers and position detection modules for determining the location and viewing angle of the user, audio systems for providing sound, and the like. One of the primary anticipated uses for these devices is to enable the user to perceive that they are present in a virtual environment. Similarly, developments in sensor technology have provided for increased access to sensors that are capable of detecting the size, location, and position of users within a physical environment.

One particular use case made possible by the ubiquity of access to virtual reality equipment is the ability to offer multi-user virtual environments. By leveraging access to sensor and display equipment across multiple separate computing nodes or devices, the inventor has recognized that it is possible to provide for virtual environments that provide users with the sensation of being in a single local physical environment with other users, even if those other users are located at remote locations. However, the inventor has also identified a number of challenges in implementation of these multi-user virtual environments. Traditional, non-VR, multi-user environments such as multiplayer video games and collaborative document editing applications operate by detecting particular actions performed using input devices such as a keyboard or mouse (e.g., keystrokes, mouse cursor movements, mouse clicks, and the like). These multi-user environments are unaware of the particular physical shapes, positions, and locations of users, as the limits of traditional, non-VR display devices fail to provide an immersive experience that would benefit from the inclusion of actual information about other users. Through applied effort and ingenuity, the inventors have identified solutions to these problems and other problems related to providing multi-user virtual environments.

The inventor has identified that the use of actual user physical location, position, and size data may provide unique benefits in the context of a virtual environment. In particular, since virtual environments attempt to immerse the user in an experience that simulates an actual physical environment, including data representing other users in the virtual environment may enhance the ability of users to interact with virtual environment and one-another. To this end, the inventor has developed various methods, techniques, and processes that improve the multi-user VR experience.

As noted above, state-of-the-art multi-user environments rely on client applications to provide data relevant to managing the multi-user environment. User inputs made to an application are translated into events relevant to the environment. For example, mouse clicks or keystrokes may be interpreted as indications to fire a weapon in a game environment, or keystrokes may be interpreted as messages to be sent to another user. Rather than transmit the raw mouse click or keystroke data, such environments transmit the resulting change to the environment (e.g., transmission of a "fire weapon" event rather than a "left mouse click" event). Such input techniques are adequate for non-virtual environments, which do not attempt to create a fully immersive simulation. However, the inventors have realized that, in the case of virtual environments, it is desirable to transmit sensor data received from one or more sensors coupled to a local device in addition to information related to a virtual environment. The use of such data allows for a receiving device to recreate the position, location, size, and the like of a remote user.

The inventors have realized that recreating the remote user on the local device using sensor data obtained at least in part from a remote sensor provides a number of benefits to implementation of the virtual environment. For example, receiving the sensor output of the remote computer allows the local computer to provide an exact replica of the remote user which may be used to display the remote user in a virtual environment experienced by the local user. Similarly, the sensor data may be employed as a check or verification of virtual environment data received from the remote user to ensure that the remote user has not tampered with or otherwise altered the virtual environment data or a virtual environment engine used to generate that virtual environment data.

The inventors have also realized that there are advantages to sending sensor data at different frequencies or otherwise out of phase with virtual environment data. Sending such data out of phase enables faster updates to displays of the remote user since the data does not necessarily need to be processed by a local virtual environment engine before transmission.

To achieve these benefits, the inventor has also addressed a number of technical challenges regarding transmission and processing of sensor data for use in a virtual environment. For example, the inventor has determined that, in many cases, compression of transmitted sensor data may be performed in a manner that significantly reduces network bandwidth required to transmit data while maintaining the other benefits described above. The inventor has also developed techniques for packaging and post-processing sensor data to improve the transmission of said sensor data to remote computers and processing of the sensor data by the remote computer.

The inventor has also developed techniques related to generation of a shared virtual environment using both local sensor data and sensor data received from a remote computer. These techniques include calibrating sensor data to enable placement of both local users and remote users in the same virtual environment and techniques to identify the source of sensor data. The inventor has also developed improvements to interfaces for receiving sensor data that allow such interfaces to receive data from remote sources while processing the remote data as though it was received from a local sensor.

Multi-user virtual reality environments such as described herein may be utilized to implement a variety of functionality across many different technical disciplines. Such environments may be employed to improve home automation systems (e.g., interfacing with home temperature, lighting, and security systems), to control factory operations (e.g., controlling robotic equipment, security systems, observing workers), to control mobile objects such as drones, and to interact with other users in those environments to share information, demonstrate presentations, or the like. The use of a virtual environment may also allow the user to leverage cameras or other sensors coupled to a remotely controlled device or system to present the user with the experience of being in the physical location of the controlled object and to share that experience with other users.

The inventors have also recognized that virtual environments may be utilized to capture and playback a user's local environment. The capture of local sensor data about a user's physical environment may allow the user to record audio, video, and other gathered sensor information about their physical environment for later review. For example, if the user has a home equipped with sensors for capturing a physical environment, the user may enable recording of that sensor data during a particular event (e.g., a child's birthday party), so that later on the user can playback the sensor readings to recreate the physical environment in a virtual scenario. Such embodiments may allow the user to relive recorded events or review events for which they were not present (e.g., to simulate being on the field of the Superbowl during the game, or to play back a wedding reception).

The inventors have also recognized deficiencies in methods and systems for tracking user positions and calibrating sensors used for position tracking for providing input to a virtual environment. To this end, the inventors have developed novel systems for integrating data received from infrared sensors, accelerometers, gyroscopes, magnetometers, and the like. Tracking data received from these disparate systems may be merged and smoothed to improve techniques for identifying user positions. Furthermore, the inventors have calibration mechanisms for adjusting input from different sensors. The inventors have developed techniques for determining when a HMD is placed on the user's head by monitoring data received from multiple sensors, and performing various detection and calibration actions in response. For example, when embodiments detect that the HMD has been picked up and placed on the user's head based on accelerometer readings, the user's position may be detected in three dimensional space and calibrated to a virtual environment coordinate system.

The inventors have also realized that a variety of interfaces and sensors may be employed to interact with a virtual environment. To interact with the virtual control objects as described herein (and to enable other interactions not provided by the virtual control objects), the inventors have realized that various devices providing different feedback mechanisms may be employed. For example, the use of specially designed gloves or shoes may provide tactile and/or haptic feedback related to touching buttons, feeling textures of items, and the like.

The inventors have also developed systems that provide novel features for sharing an environment with other users. Sensor data from both local and remote devices may be employed to provide proximity alarms and other feedback related to distance between the user and both physical objects in the user's local physical environment (e.g., other users, furniture), and virtual objects in the virtual environment (e.g., an avatar of another user participating in the virtual environment from another physical location).

It should also be understood that the embodiments presented herein are particularly directed to methods, apparatuses, systems, and computer program products for generating and interacting with a multi-user virtual environment and otherwise causing the computers to perform certain functions via input related to a virtual environment. As such, these embodiments are necessarily related and directed to improvements for providing such multi-user virtual environments and causing said computers to operate in particular improved manners, and these improvements address technical problems unique to said multi-user virtual environments.

System Architecture and Example Apparatus

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods, apparatuses, and computer program products of the present invention may be embodied by any of a variety of devices. For example, the method, apparatus, and computer program product of an example embodiment may be embodied by a networked device or devices, such as a servers or personal computers in communication with a HMD and one or more sensors. Additionally or alternatively, the computing device may include fixed or networked computing devices, such as a personal computer or a computer workstation. Still further, example embodiments may be embodied by any of a variety of mobile terminals, such as a portable digital assistant (PDA), mobile telephone, wearable, smartphone, laptop computer, tablet computer, or any combination of the aforementioned devices.

In this regard, FIG. 1 discloses an example computing system within which embodiments of the present invention may operate. A server 102 may function to communicate with one or more sensors 104 and an HMD 106. The server 102 may include hardware and software configured to generate and manage a virtual environment that is displayed to a user via the HMD 106. The server 102 may also receive data from one or more sensors 104 to identify objects in a local physical environment. A detailed exemplary embodiment of the server 102 is described further below with respect to FIG. 2.

The HMD 106 may send and receive electronic data from the server 102. For example, the HMD 106 may send data to the server 102 indicating readings from one or more accelerometers or other position sensors contained in the HMD 106. The HMD 106 may receive data indicating video content to display via one or more displays included in the HMD 106 and audio content to output via speakers, headphones, or the like included in the HMD 106. A detailed exemplary embodiment of the HMD 106 is described further below with respect to FIG. 3.

The sensor 104 may be any sensor operable to receive information about a user or the user's physical environment that may be employed by the server 102 to generate the virtual environment For example, the sensor may be a Kinect® sensor manufactured by Microsoft, a Leap Motion® controller manufactured by Leap Motion Inc., a data glove, a wand such as the PS Move® manufactured by Sony Corp., a motion capture system, a digital camera, a capacitive touch interface, or any other sensor capable of generating sensor data that indicates the presence of an object at particular location or depth. The sensor 104 may provide data in a raw format to the server 102, where the raw data may be converted into position information indicating the position of physical objects in the physical environment perceived by the sensor. Some embodiments may include multiple sensors and data from the sensors may be processed and combined together to determine the positions of objects within the physical environment.

The sensor 104 captures sensor data which may be employed to determine the state of the local physical environment, such as the location, size, and movement of one or more users, the location, size, and movement of physical objects within the sensor's field of view, and the like. It should be appreciated that, as described above, one or more of the sensors 104 may be included as part of or coupled to the HMD 106.

The sensor 104 may capture data in a particular physical area within the sensor's detection area or field of view. In some embodiments, the sensor detects objects by generation of a depth map. The depth map may include a frame of pixels associated with particular physical locations in the sensor's detection area. Each pixel may be associated with a value that represents the associated distance or depth of any objects located at the pixel from the sensor, such as in the case of infrared sensor emitter/receiver sensors.

The server 102 may include a sensor interface 118 which receives sensor data from the sensor 104. The sensor interface 118 may include both hardware and software for receiving data from the sensor 104. For example, the sensor interface 118 may include a physical wired connection or wireless antenna for communicating with the sensor 104. The sensor interface 118 may also include software applications for communicating with the sensor 104, such as device drivers and tools for interpreting and/or post-processing sensor data. For example, the sensor interface 118 may include a device driver and a tool for determining object positions based on received sensor data. The sensor interface 118 may communicate with an HMD interface 116, a virtual environment engine 120 and a network interface 122 to provide data for implementing a virtual environment. The sensor interface 118 may provide the HMD interface 116 with sensor data for use in recreating elements of a physical environment in a virtual environment displayed in the HMD 106. For example, the sensor interface 118 may bypass the virtual environment engine 120 and provide sensor data directly to the HMD interface 116 for display on the HMD 106. Additionally or alternatively, the sensor interface 118 may provide sensor data to the virtual environment engine 120 for use in updating the state of a virtual environment.

The sensor interface 118 may perform post-processing, formatting, and/or packaging to the sensor data. For example, the sensor data may take the form of multiple frames of sensor captures over a period of time. These multiple frames of data may be used as part of a smoothing and/or filtering process to reduce or eliminate noise and artifacts from the data. In yet further embodiments, the sensor data may be analyzed to identify the presence of certain objects of interest (e.g., users) and the results of this analysis may be provided to the virtual environment engine instead of or in addition to the raw sensor data. In yet further embodiments, the sensor interface 118 may track additional data related to a physical environment other than the raw sensor data. For example, the sensor interface 118 may identify the presence of background objects other than the user (e.g., furniture, walls, and other objects in the user's physical environment), and cache the presence of such objects even when outside of the field of view of the sensor (e.g., when the user occludes the sensor's field of view by moving in front of the object). Although functions related to identification of objects and caching the presence of detected objects are generally described with respect to the sensor interface 118, it should also be appreciated that such functions may also be provided by other elements or components of the server 102. For example, in some embodiments object detection may be performed by the sensor itself before the sensor data is provided by the sensor interface, while in other embodiments object detection, caching, and display may be performed by the virtual environment engine 120.

Although examples as provided herein may generally relate to a single user interacting with each device, it should be appreciated that sensor data captured by devices may include multiple separate users. For example, a given device may include a single sensor that is capable of tracking a plurality of users, a plurality of sensors each tracking a single user, or any combination thereof. It should also be appreciated that different devices may be configured differently and still participate in the same multi-user virtual environment. For example, a first device may have a first type of sensor, and a second device in communication with the first device may have a different type of sensor. In this regard, the sensor interface 118 may be capable of processing data from multiple types of sensors, even sensors not present on the server 102.

The sensor interface 118 may be configured to control capture of sensor data according to a variety of parameters. These parameters may include, but are not limited to, configuration settings for the sensor itself (e.g., refresh rates, resolutions, instructions for motors and lenses included in the sensor), configuration settings for internal or network transmission of sensor data (e.g., a frequency with which to send frames of sensor data to the virtual environment engine or to a remote device via a network interface, a frequency with which to send frames of cached background data), configuration settings related to post-processing and analysis of the sensor data (e.g., pixel radii for extending detected user masks, number of frames of sensor data to use for smoothing operations), or the like. The parameters may be configurable directly by users or administrators of the server 102, programmatically by applications executing upon the server 102, or via network instructions received from a remote device.

The HMD interface 116 may include hardware and software configured to send and receive data from the HMD 106. To the extent that the HMD 106 includes one or more sensors, the HMD interface 116 may provide the same or similar functionality with respect to those HMD sensors as described above with respect to the sensor interface 118. The HMD interface 116 may also include graphics hardware (e.g., a graphics processing unit) for outputting display information to one or more displays included in the HMD 106, and audio hardware for outputting sound to one or more speakers included in the HMD 106. The HMD interface 116 may also include other hardware for communicating with elements of the HMD 106, including but not limited to hardware for communicating with vibration elements and other tactile feedback components, Light Emitting Diodes (LEDs) and other beacons for perception by sensors 104, and various other sensors 104 of the HMD 106 for sending and receiving various forms of input and output to facilitate presentation of the virtual environment to the user.

The virtual environment engine 120 may manage the state of a virtual environment provided by the server 102. The virtual environment engine 120 may receive sensor data from the sensor interface and update and modify the virtual environment based on the sensor data. For example, physical objects detected in the sensor data may be mapped into a virtual environment and/or used to generate virtual representations of the physical objects. The virtual environment engine 120 may also monitor for various triggers, interactions, and the like occurring within the virtual environment. The virtual environment engine 120 may thus include various threads, processes, and functions to maintain the state of the virtual environment, to transmit the state of the virtual environment to other devices (e.g., as virtual environment data), provide instructions for displaying the virtual environment, and otherwise facilitate the user's perception of and interaction with the virtual environment.

The network interface 122 may include hardware configured to send and receive data over a network 112 to other computing nodes coupled to the server 102, such as a remote device 114. The network interface 122 may send and receive sensor data and virtual environment data to and from other computing nodes participating in a shared virtual environment. The network interface 122 may assist with packaging, compressing, and transmitting data into formats suitable for transmission over a network. Alternatively, in some embodiments other components of the system, such as the sensor interface 118 and the virtual environment engine 120 may process and package data for transmission prior to providing data to the network interface.

The network 112 may be any computer network capable of establishing electronic communications between computing nodes as known in the art. For example, the network 112 may be a packet-switched network such as the Internet. It should be appreciated that embodiments may communicate via a variety of wired and wireless network protocols, such as Ethernet, the 802.11 series of wireless protocols, Bluetooth, or any other network as known in the art.

Example Apparatuses for Implementing Embodiments of the Present Invention

Figure 2:
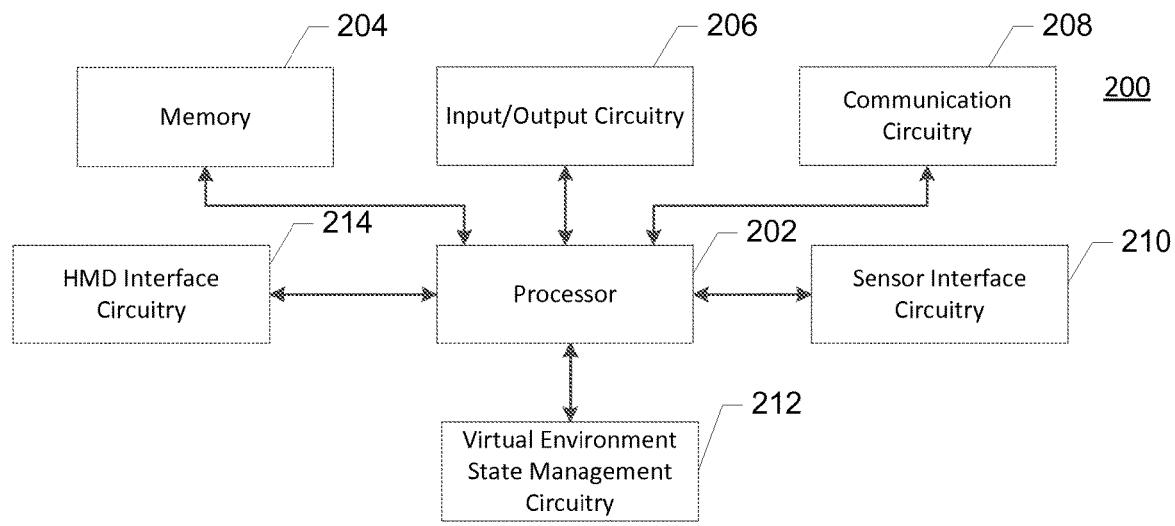
FIG. 2 is a block diagram illustrating exemplary components of a computing device in accordance with certain exemplary embodiments.

The server 102 may be embodied by one or more computing systems, such as the apparatus 200 shown in FIG. 2. As illustrated in FIG. 2, the apparatus 200 may include a processor 202, a memory 204, input/output circuitry 206, communications circuitry 208, sensor interface circuitry 210, virtual environment state management circuitry 212, and HMD interface circuitry 214. The apparatus 200 may be configured to execute the operations described above with respect to FIG. 1 and below with respect to FIGS. 4-15. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, also software for configuring the hardware. For example, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality used by other components of the apparatus 200.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communication circuitry 208 may be any means such as a device or circuitry embodied in either hardware or a combination of hardware and software that is configured to receive and/or transmit data from/to a network and/or any other device, circuitry, or module in communication with the apparatus 200. The communication circuitry 208 may implement a network interface 122 as described above with respect to FIG. 1. In this regard, the communication circuitry 208 may include, for example, a network interface for enabling communications with a wired or wireless communication network. For example, the communication circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s)

The sensor interface circuitry 210 may include hardware configured to send instructions to, and receive data from, one or more sensors coupled to the server, such as the sensor 104 described above with respect to FIG. 1. The sensor interface circuitry 210 may implement a sensor interface 116 as described above with respect to FIG. 1. The sensor interface circuitry 210 may include electrical connections configured to, wired or wirelessly, communicate with the sensors. The sensor interface circuitry 210 may also facilitate capture and transmission of sensor data to other components of the system, such as providing sensor data to the virtual environment state management circuitry 212 for updating the virtual environment, or providing sensor data to the communication circuitry 208 for transmission. The sensor interface circuitry 210 may also provide for post-processing and analysis of received sensor data prior to providing the sensor data to the virtual environment state management circuitry or the communications circuitry. The sensor interface circuitry 210 may also include processing circuitry, such as the processor 202, to execute one or more tools, drivers, application programming interfaces (APIs) or the like for communicating with the sensors and processing the sensor data. It should also be appreciated that, in some embodiments, the sensor interface circuitry 210 may include a separate processor, specially configured field programmable gate array (FPGA) or application specific interface circuit (ASIC) to perform the functions described herein. The sensor interface circuitry 210 is therefore implemented using hardware components of the apparatus configured by either hardware or software for implementing the functions enumerated above.

The virtual environment state management circuitry 212 includes hardware configured to manage a virtual environment state. As noted above, the virtual environment state includes electronic data indicating the locations and statuses of one or more objects in a virtual environment. The virtual environment state management circuitry 212 may also implement other aspects of a simulation to control the virtual environment state. For example, the virtual environment state management circuitry 212 may manage the rate at which the virtual environment updates, the resolution of coordinate locations of objects within the virtual environment, simulation of interaction between objects in the virtual environment, and the like. The virtual environment state management circuitry 212 may include processing circuitry, such as the processor 202, for managing the virtual environment. It should also be appreciated that, in some embodiments, the virtual environment state management circuitry 212 may include a separate processor, specially configured field programmable gate array (FPGA) or application specific interface circuit (ASIC) to perform the functions described herein. The virtual environment state management circuitry 212 is therefore implemented using hardware components of the apparatus configured by either hardware or software for implementing the functions enumerated above.

The HMD interface circuitry 214 functions to provide electronic data to and from a HMD to enable the user of the HMD to experience the virtual environment via the HMD and to provide sensor data to the virtual environment state management circuitry 212 from any sensors coupled to the HMD. For example, the HMD interface circuitry 214 may provide display output to one or more displays included in the HMD to display a portion of the virtual environment to the user, and receive input form one or more accelerometers included in the HMD to determine a user viewing angle to assist the virtual environment state management circuitry 212 to determine which particular portion of the virtual environment to display on the HMD display(s). In some embodiments, the HMD interface circuitry 214 includes a processor or graphics processing unit (GPU) to enable display output to the HMD. It should be appreciated that in some embodiments the virtual environment state management circuitry may also share or utilize the same processor or GPU to manage the virtual environment state to assist with managing the virtual environment. In some embodiments, interface with the HMD is enabled via one or more drivers or APIs that send data as a single signal or other particularly defined communication technique uniquely associated with the HMD, while in other embodiments the HMD interface circuitry 214 communicates directly with particular components of the HMD (e.g., a single video-out to each display of the HMD, a single audio-out for audio components of the HMD, data inputs for each sensor coupled to the HMD).

The HMD interface circuitry 214 may include processing circuitry, such as the processor 202, for providing data to the HMD. It should also be appreciated that, in some embodiments, the HMD interface circuitry 214 may include a separate processor, specially configured field programmable gate array (FPGA) or application specific interface circuit (ASIC) to perform the functions described herein. The HMD interface circuitry 214 is therefore implemented using hardware components of the apparatus configured by either hardware or software for implementing the functions enumerated above.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 3:
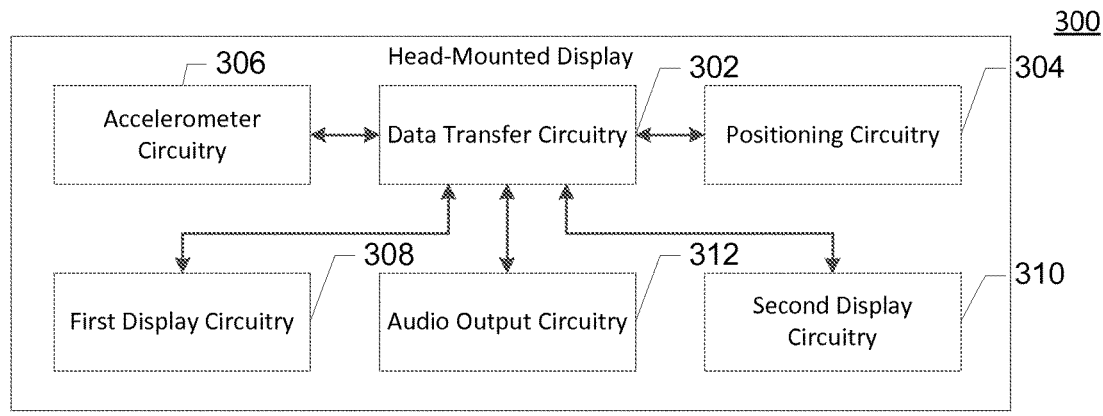
FIG. 3 is a block diagram illustrating exemplary components of a head-mounted display for use in a virtual reality system in accordance with some exemplary embodiments.

Referring now to FIG. 3, a block diagram is illustrated showing an example HMD apparatus 300 that enables a user to experience a feeling of immersion in a virtual environment through the use of a head-mounted display screen. The apparatus 300 may include or otherwise be in communication with data transfer circuitry 302, position location circuitry 304, accelerometer circuitry 306, first display circuitry 308, second display circuitry 310, and audio output circuitry 312. As noted above, each of the components of the HMD may, in some embodiments, be implemented as a single housing with individual discrete components not in communication with one another (e.g., two separate displays each receiving a separate input signal, headphones and/or a microphone with discrete audio input/output signals, accelerometers that communicate directly with components of a server apparatus such as the apparatus 200, and the like), while in other embodiments the HMD apparatus 300 may be implemented as multiple components in communication with one another and with a server apparatus 200 via particular data transfer circuitry 302. The data transfer circuitry 302 may thus include electronic components configured to process electronic signals from the different components of the HMD and translate said components into a signal, signals, stream, or streams suitable for consumption by a server 200, and translate a signal, signals, stream, or streams from the server into signals suitable for consumption by the individual components of the HMD.

The HMD may include accelerometer circuitry 306 for detecting movement, pitch, bearing, orientation, and the like of the HMD. This information may be provided to a server for use in determining which area of the virtual environment corresponds to the orientation/bearing of the HMD, so that said corresponding area of the virtual environment may be displayed via the first display circuitry 308 and/or second display circuitry 310.

The positioning circuitry 304 may include electronics for configuring and communicating with location services modules and functionality associated with the HMD. For example, embodiments of the HMD apparatus 300 may include one or more infrared beacons that may be turned on and off in response to signals from a server. These infrared beacons may enable detection by infrared sensors coupled to the server. The positioning circuitry 304 may thus function to turn said infrared beacons on and off, cause the infrared beacons to blink at a particular rate or in a particular pattern, and otherwise assist with location detection and physical environment calibration functions. In some embodiments the HMD may include a global positioning system receive as part of the positioning circuitry 304, and it should be readily appreciated that a variety of different location and positioning technologies could be employed to assist with detection of the position of the HMD apparatus 300.

The first display circuitry 308 and the second display circuitry 310 include hardware, such as a projection screen, liquid crystal display panel, or the like for displaying signals received from the server. It should be appreciated that the first display circuitry 308 and the second display circuitry 310 may share some common hardware and/or software elements. For example, in some embodiments each of the first display circuitry 308 and the second display circuitry 310 are entirely separate displays receiving separate input signals. In other embodiments, the first display circuitry 308 and the second display circuitry 310 may include a single display panel with a separation by a physical element of the HMD (e.g., a blocking panel positioned near the user's nose). In yet further embodiments, a single display signal may be provided to circuitry which may split the signal to create two different sources for two separate display panels. The use of two displays in this manner allows for a server to output two separate images which may be employed to create a stereoscopic three-dimensional image. However, it should also be appreciated that in some embodiments the HMD may include only a single display or not even display a stereoscopic image at all, but still serve to display a virtual environment to the user of the HMD and enable interaction with that virtual environment in accordance with embodiments of the present invention.

The HMD apparatus 300 may include audio output circuitry 312 configured to output an audio signal. For example, the HMD apparatus 300 may include built-in speakers, headphones, or the like for outputting sounds to the user wearing the HMD.

Example of a Multi-User Virtual Environment Data Flow

Figure 4:
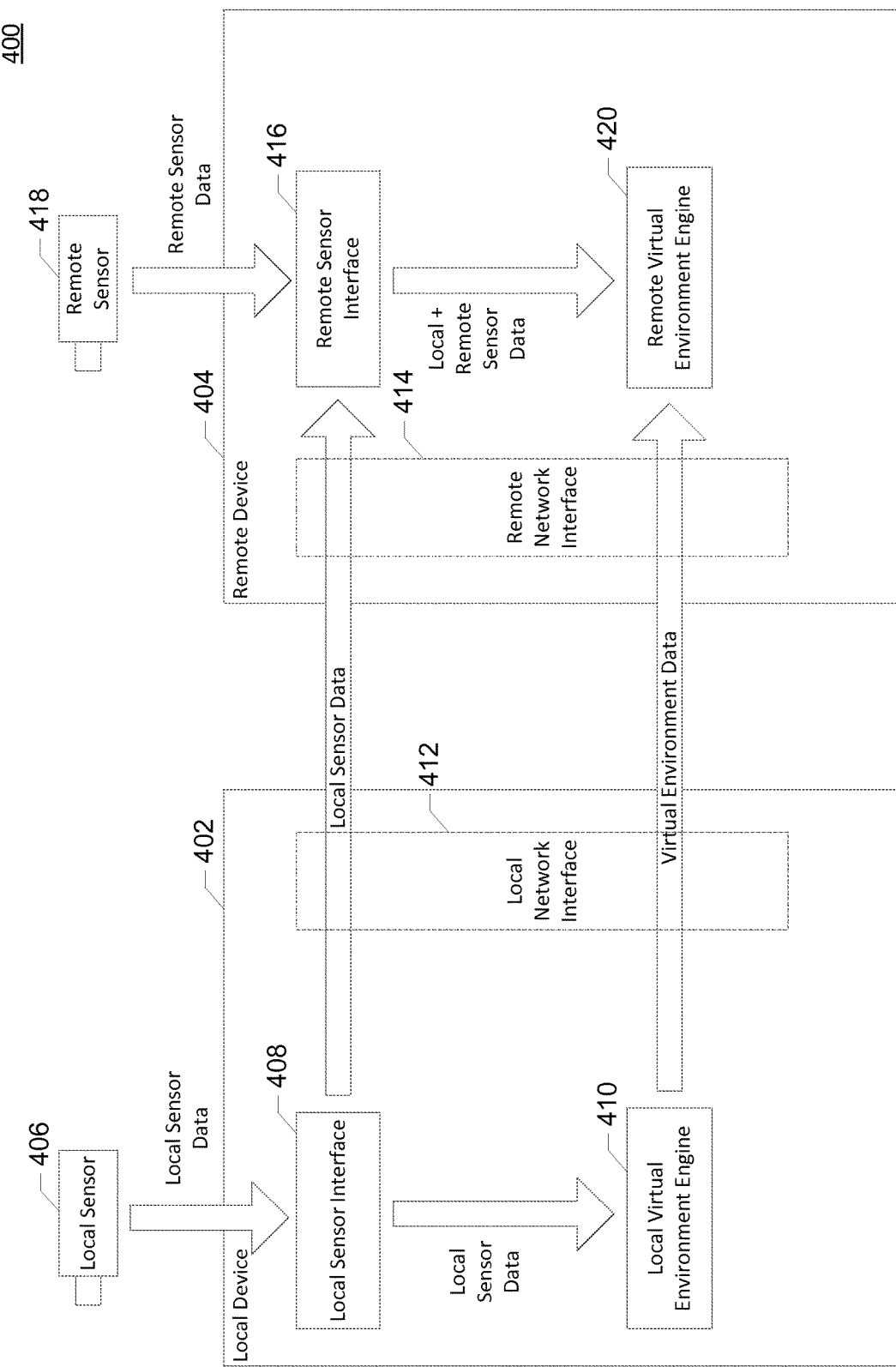
FIG. 4 is a data flow diagram illustrating the flow of electronic data between different components of a virtual reality system in accordance with some exemplary embodiments.

FIG. 4 depicts an example data flow 400 illustrating interactions between different components of a virtual reality system operable to immerse a user in a virtual environment and to implement a multi-user virtual environment. In particular, the data flow 400 illustrates how a local device 402 may receive electronic data from one or more sensors 406 through a local sensor interface 408, process the sensor data using the local sensor interface 408, and provide the sensor data to both a local virtual environment engine 410 and to a remote sensor interface 416 of a remote device 404 to facilitate implementation of a multi-user virtual environment by the local device 402 and the remote device 404.

The local device 402 and the remote device 404 may be computing devices as known in the art. For example, each device may be configured as or similarly to the apparatus 200 described above with respect to FIG. 2. Each device may also include a HMD (not pictured) for displaying a virtual environment. The HMD may be configured as described above with respect to FIG. 1 and FIG. 3.

In the present exemplary context, the local device 402 and the remote device 404 are generally described as peer nodes, that each have similar functionality with respect to receiving and processing sensor data and managing a virtual environment state. However, it should be appreciated that embodiments may also include scenarios where one device acts as a client device and the other device acts as a server device, or where multiple client devices interact with a server device. For example, while the present data flow 400 illustrates two devices exchanging information with one another, an alternative embodiment may have two client devices communicating with a third, server device that does not include any local sensor data, but only receives sensor data from external devices.

The sensor data generated by the local sensor 406 is received by the local sensor interface 408. The local sensor interface 408 may be a sensor interface such as described above with respect to the sensor interface 118 described with respect to FIG. 1 and the sensor interface circuitry 210 described with respect to FIG. 2. The local sensor interface 408 may receive the sensor data and manage distribution of the sensor data to a local network interface 412 for transmission to the remote device 404 and a local virtual environment engine 410.

The local sensor interface 408 may manage transmission of the local sensor data to a remote sensor interface 416 on the remote device 404. To perform this function, the local sensor interface 408 may utilize the local network interface 412 to open a network connection between the local device 402 and the remote device 404. In some embodiments, a single network connection is established between the local device 402 and the remote device 404 for all data transmissions between the local device 402 and the remote device 404 (e.g., both sensor data and virtual environment data). In such cases sensor data and virtual environment data may be transmitted in packets explicitly reserved for a particular type of data (e.g., with particular packets reserved for either sensor data or virtual environment data), or in packets containing both data types (e.g., a single data packet or set of packets including fields for both sensor data and virtual environment data in the same structure). In other embodiments, different network connections are established between the local device 402 and the remote device 404 for different types of data. For example, sensor data may be transmitted on a first network port, and virtual environment data may be transmitted on a second network port. Network connections between the local device 402 and the remote device 404 may be established according to various network protocols, including but not limited to Transmission Control Protocol/Internet Protocol (TCP/IP), User Datagram Protocol (UDP), or various other unicast or multicast network protocols.

Network connections as described herein may be logical connections (e.g., through the use of multiple sockets, ports, IP addresses, or the like), and/or physical connections (e.g., through the use of multiple network interface cards or physical Ethernet connections). The different network connections employed by embodiments of the present invention may be implemented according to different protocols from one another. For example, in some embodiments virtual environment data may be transmitted according to protocols supporting acknowledgement of data packets (e.g., TCP/IP), while sensor data may be transmitted according to unacknowledged protocols (e.g., UDP), or vice-versa. In some embodiments Transmission of sensor data and virtual environment data may be performed simultaneously or asynchronously. For example, virtual environment data may be transmitted at a first interval (e.g., 5 ms, 100 ms, 500 ms) and sensor data may be transmitted at a second interface (e.g., 10 ms, 250 ms, 1000 ms). The transmission frequency for each data type may also be dynamically varied. For example, in some embodiments virtual environment data may be transmitted based on events that occur in the virtual environment (e.g., upon changes in the state of objects in the virtual environment, or upon detection of particular user inputs), while sensor data may be transmitted at a set frequency, or vice-versa. In some embodiments, sensor data is transmitted more frequently in cases where greater changes are detected in the sensor data over a particular time period (e.g., where objects are moving more quickly). In other embodiments the transmission frequency of sensor data may be dependent upon the number of users visible to the sensor (e.g., more users resulting in increased transmission frequency).

The local sensor interface 408 may also process, analyze, compress, and/or package the local sensor data before transmission to the remote device 404. The local sensor interface 408 may perform smoothing, filtering, or other post-processing to the local sensor data to remove noise, reduce artifacting, and the like. The local sensor interface 408 may also identify objects of interest within the sensor data (e.g., objects suspected of being users). For example, the local sensor interface 408 may identify particular pixels of a frame of sensor data that are suspected of being associated with users, and other pixels that are suspected of being associated with background objects. The pixels suspected of being associated with users may be identified within an image mask that is sent to the remote device 404 along with the raw sensor data. Pixels suspected of being associated with background objects may be identified and cached locally. Cached data may be sent to the remote device 404 along with the raw sensor data as well to identify objects that are not readily identifiable in a particular sensor frame but which were previously identified (e.g., objects occluded by a user moving between the object and the sensor).

The local sensor interface 408 may also provide the local sensor data to the local virtual environment engine 410. The local virtual environment engine 410 may use the local sensor data to identify the location of objects within the virtual environment for the purpose of managing the virtual environment, updating the position of virtual objects in the virtual environment based on the position of objects identified in the local sensor data, and the like. The local virtual environment engine 410 may function to generate and maintain a shared virtual environment for multiple users. The virtual environment engine may also identify triggering actions, functions, and other processing events based on relationships between virtual objects. For example, the local virtual environment engine 410 may be a "game engine" or other simulation that is used to generate a three dimensional virtual environment for output to one or more HMDs.

The local virtual environment engine 410 may transmit virtual environment data to a remote virtual environment engine 420 executing on or as a component of the remote device 404 to synchronize the virtual environment for the users of both the local device 402 and the remote device 404. The virtual environment data may include data related to a state of the virtual environment at given time internal (e.g., where the local virtual environment engine sends data at particular intervals), or in response to certain events (e.g., where the local virtual environment engine sends data in response to particular criteria, inputs, actions, or the like associated with the virtual environment). The local virtual environment engine 410 may also manage output to a display of the HMD to display portions of the virtual environment to a user. For example, the local virtual environment engine 410 may provide data to a graphics processing unit (GPU) for output to one or more displays of the HMD.

The local virtual environment engine 410 may enable the user or users to interface with a virtual environment through the use of virtual control objects. Detected interactions with these virtual control objects may be transmitted to the remote device 404 as virtual environment data. Exemplary embodiments of such virtual control objects and exemplary systems, methods, and devices for implementing interaction techniques with such objects are described further in concurrently filed U.S. patent application Ser. No. 14/608,047, filed Jan. 28, 2015, titled "METHOD AND SYSTEM FOR RECEIVING GESTURE INPUT VIA VIRTUAL CONTROL OBJECTS", the entire contents of which are herein incorporated by reference.

The local virtual environment engine 410 and/or the local sensor interface 408 may also be configured to detect the presence of physical objects within the sensor data, including the presence of a user and any other physical objects located in the field of view of the sensor. Detected physical objects may be used to generate virtual representations of said objects that are displayed in the virtual environment. The virtual representations may be generated from the sensor data used to detect said objects. In some embodiments, a graphics processing unit is used to generate polygons from frames of the sensor data. The presence of detected physical objects and/or their corresponding virtual representations may be cached locally and stored within a set of cached object data to enable display of those virtual representations even when the physical objects are not visible within the sensor data, such as when the physical object is occluded from the sensor data. Exemplary embodiments for detecting physical objects, including both users and non-user objects, and methods for generating virtual representations corresponding to those physical objects are described further in concurrently filed U.S. patent application Ser. No. 14/608,067, filed Jan. 28, 2015, titled "METHOD AND SYSTEM FOR PROVIDING VIRTUAL DISPLAY OF A PHYSICAL ENVIRONMENT", the entire contents of which are herein incorporated by reference.

The remote device 404 may be configured similarly to the local device 402, with a corresponding remote sensor interface 416 in communication with a remote virtual environment engine 420. The remote sensor interface 416 may be configured to receive remote sensor data from a remote sensor 418 in a similar manner to the way in which the local sensor interface 408 receives sensor data form the local sensor 406. The remote virtual environment engine 420 may manage a virtual environment for the remote device 404 in a similar manner by which the local virtual environment engine 410 manages the virtual environment for the local device.

The remote device 404 may also include a remote network interface 414. The remote network interface may be configured to receive data from a network, such as the network 112 as described above with respect to FIG. 1. Each of the local network interface 412 and the remote network interface 414 may be embodied as communication circuitry as described above with respect to FIG. 2.

The remote device 404 may receive local sensor data and virtual environment data from the local device 402 via the remote network interface 414. As noted above, in some embodiments the local sensor data and the virtual environment data may be received via the same network connection (e.g., the same socket), and in other embodiments the local sensor data and the virtual environment data may be received via different sockets. In some embodiments, each of the respective sensor interfaces and virtual environment engines associated with the local device 402 and the remote device 404 establishes separate network connections for their respective data transmissions, while in other embodiments the different data transmissions may be synchronized or otherwise packaged together.

The remote network interface 414 may provide the received local sensor data to the remote sensor interface 416. The remote sensor interface 416 may receive the local sensor data and process the local sensor data in the same or a similar manner as remote sensor data received from the remote sensor 418 is processed. In some embodiments, the remote sensor interface 416 may be unable to determine whether a particular set of sensor data is received from a source local or remote to the particular device. In other embodiments, a given set of sensor data may be marked with certain metadata to indicate the origin of the data. In some embodiments, sensor data provided over a network may be processed and analyzed prior to transmission, such that the remote sensor interface 416 does not need to process and analyze the data again. In this manner, embodiments may reduce the processing overhead in processing sensor data, as each set of sensor data may be first processed on its respective local device prior to transmission, since the sensor data is typically processed locally prior to being provided to the respective virtual environment engine. As such, data provided to a remote device over the network may already be smoothed, filtered, and analyzed such that the processing required by the remote device is reduced. Alternatively, in some embodiments the local sensor data may not be processed prior to transmission to the remote device. For example, in some scenarios the local device and the remote device may have different processing capabilities, such as where the local device is a mobile phone and the remote device is a rack-mounted server, a cloud server, or a desktop computer. In such cases, sensor data may not be processed or analyzed locally prior to transmission to the remote device, with the expectation that the sensor data will be processed and analyzed by the receiving computer.

The remote sensor interface 416 may package the remote sensor data and the local sensor data together to be provided to the remote virtual environment engine 420. In some embodiments, the remote sensor interface 416 may append an identifier to the sensor data to identify the source of particular sets of sensor data when providing the data to the remote virtual environment engine 420 to enable the remote virtual environment engine 420 to identify which user the sensor data is associated with. For example, the remote sensor interface 416 may mark each set of sensor data with a user number (e.g., player 1, player 2), a source computer number (e.g., device 1, device 2, device 3), a source address (e.g., the Internet Protocol address of the source computer), a sensor frame number (e.g., even numbers for local data and odd numbers for remote data), or the like. Alternatively, in some embodiments the identifier may be appended to the sensor data by the device generating the sensor data.

It should be appreciated that, although the present figure only illustrates local sensor data being provided to a remote device in a unidirectional manner, embodiments may also provide sensor data in a bidirectional manner, such that sensor data from each device is provided to other devices. Sensor data from other devices may be used to verify and/or validate virtual environment data received from those devices. In the context of multiplayer games, some malicious users may attempt to modify their local virtual environment engine to send false data that enables the malicious user to have a competitive advantage. For example, in first person shooter games, some users employ "aim bots" which modify a user's client or outgoing data packets to register false "hits" on other players. Since, in the context of a virtual environment, inputs made by the user may be performed by actions registered by the sensor data, providing the sensor data to other devices allows for a check to verify that actions indicated in the virtual environment data are legitimate.

As another example, sensor data may be used to reconstruct the appearance of a user from another device. Such data may be useful in cases where a virtual environment is established for a meeting place or a playing field that displays each user, as opposed to virtual object representations of those users. The sensor data may thus be used to generate a construct that displays the actual sensor data that captures the position, size, shape, and the like of the other user. In the context of a virtual meeting place, receiving the sensor data from the remote device may enable display of the actual image of the other user, rather than a virtual object that bears no resemblance to the other user.

Exemplary Operations for Compression of Sensor Data

Figure 5:
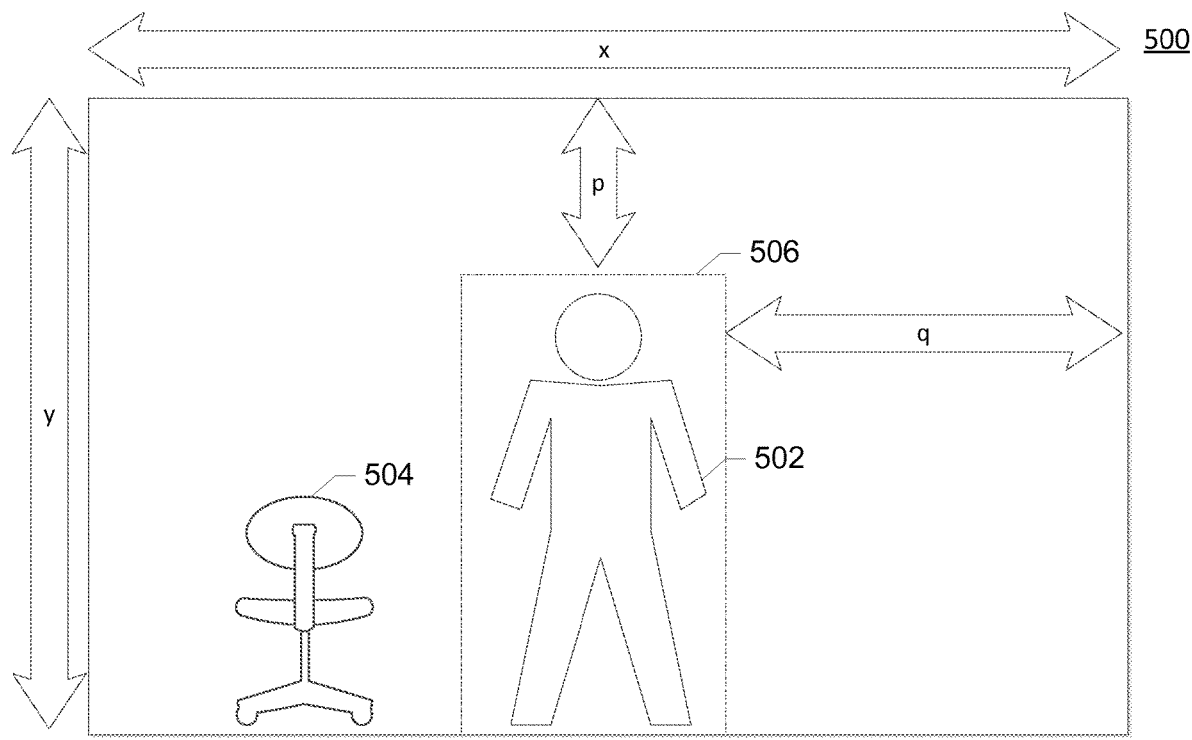
FIGS. 5-6 are illustrations of exemplary sensor data frames in accordance with exemplary embodiments of the present invention.

FIG. 5 depicts an example of a frame of sensor data 500 in accordance with embodiments of the present invention. In the present context, the sensor data 500 is a frame of pixel data. The pixel data may be presented as a series of pixels with a width "x" and a height "y". For example, the sensor data 500 may be captured from a camera, an infrared emitter/sensor, a capacitive touch panel, or the like. The intensity of pixels within the frame of data may indicate the likelihood that an object is present at a particular location of the data. The exemplary frame 500 includes a user 502 and a stationary object 504. Analysis of the frame of sensor data 500 may be performed by various processing components, such as a sensor interface as described with respect to FIG. 1 or sensor interface circuitry described with respect to FIG. 2. Analysis of the frame of sensor data 500 may provide an indication of a series of pixels likely to contain the user. This series of pixels may be identified by a mask 506. The mask 506 may identify the particular pixels or ranges of pixels that are most likely to contain a user. The mask 506 may be identified over a series of frames of sensor data by identifying a series of pixels likely to contain a user in each frame of sensor data for a plurality of sensor data frames. In some embodiments, the mask 506 may be identified by the sensor itself, or by an application or other software interface for the sensor. In some embodiments, the mask is determined by extending the known or suspected area of the user by a certain number of pixels, ensuring that the area of the mask encompasses the region of the frame including the user and a slightly larger region.

Analysis of the frame of sensor data may also be used to identify regions with objects of interest and regions that are of less interest or not of interest. For example, in the present frame 500, the vertical range of pixels identified by "p" and the horizontal range of pixels identified by "q" do not contain any objects of interest.

Figure 6:
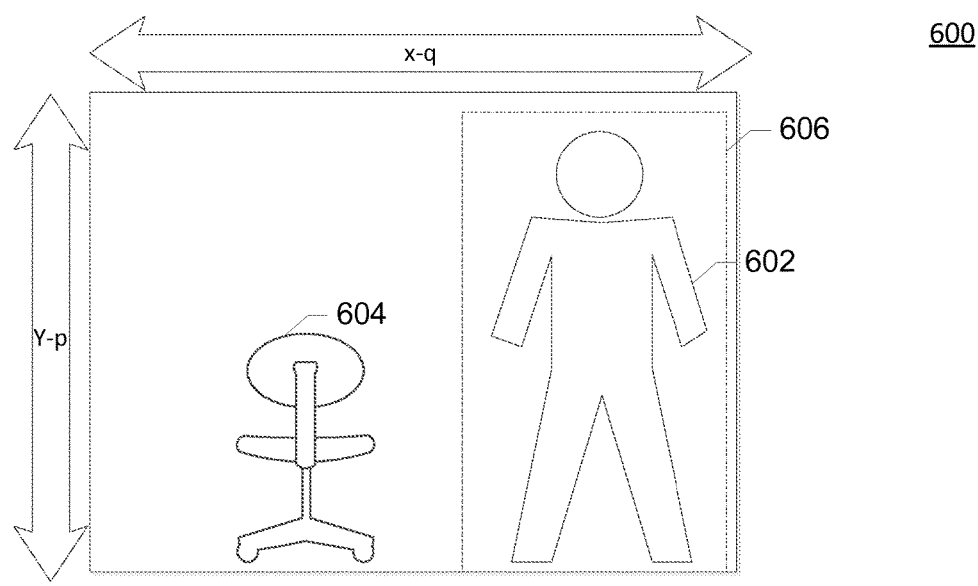

FIG. 6 illustrates a frame of sensor data 600 corresponding to the frame of sensor data 500, after a compression operation to reduce the amount of data transmitted. The frame of sensor data 600 has been cropped to remove the areas "p" and "q" that lacked any objects identified by the sensor. The frame of sensor data 600 includes the user 602, the mask 606, and the stationary object 604. By cropping the frame to exclude regions that do not contain objects of interest, the amount of data required to transmit a frame of sensor data is reduced. To account for the variability of frame size in sensor data, when transmitting the sensor data the size of the frame may be indicated by metadata accompanying the frame. It should be recognized that cropping of the frame of sensor data may also be performed according to other techniques for determining whether and how to crop the frame. For example, if a user is determined to be moving at greater than a threshold amount of speed over several frames, then cropping may be reduced or eliminated along the axis of movement. If the user is still or moving at a slower rate of speed, then the frame may be cropped more aggressively since there is less likelihood of accidentally cropping relevant frame data.

Exemplary Operations for Transmitting Cached Sensor Data

Figure 7:
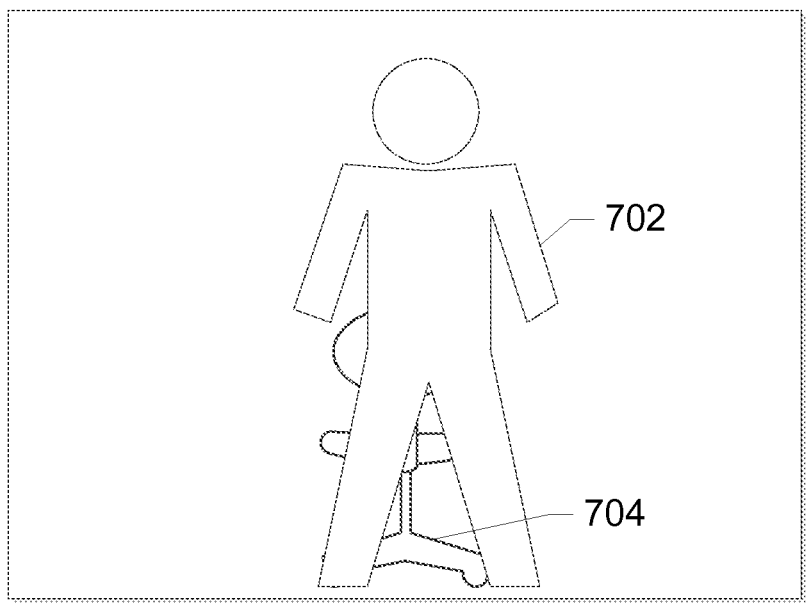
FIGS. 7-8 are illustrations of an exemplary process for maintaining static background data using captured sensor data in accordance with exemplary embodiments of the present invention.

FIG. 7 illustrates an exemplary frame of sensor data 700 depicting both a static object 704 (in this case, a desk chair) and a user 702 occluding the static object 704 from view by the sensor that captured the frame of sensor data 700. In such a scenario, the static object 704 may not be readily visible or identifiable by the sensor due to the fact that the user 702 has prevented the sensor from seeing the object clearly. However, if the static object 704 was captured in previous sensor data (e.g., before the user moved in front of the static object), then embodiments may have captured the location, size, and shape of the object and stored that information as cached background data. As such, when the user occludes the object in the frame of sensor data 700, embodiments may still be aware of the presence of the object due to the cached data.

Figure 8:
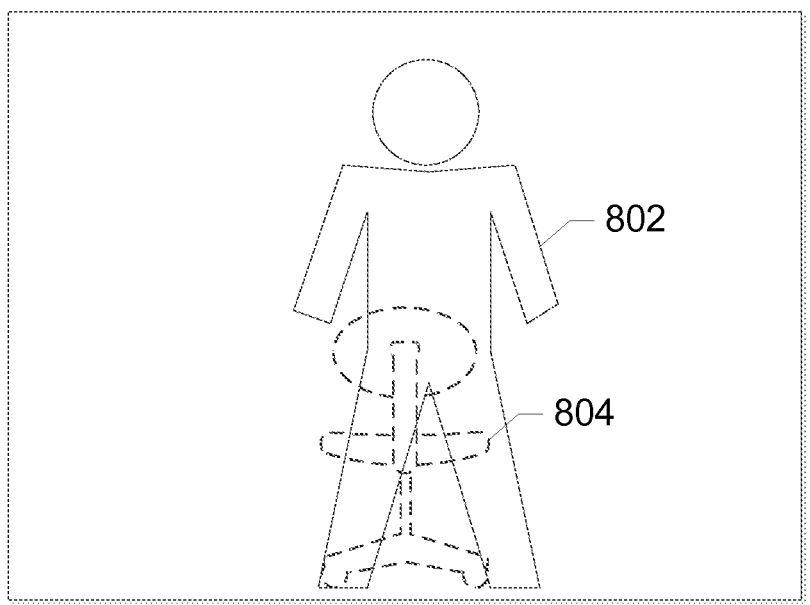

FIG. 8 illustrates an exemplary frame of sensor data 800 that includes cached data indicating the presence of a static object 804, even though the static object 804 is occluded by a user 802. In this manner, embodiments may still be aware of objects in a physical environment even when those objects are not readily visible to one or more sensors. Such objects may be stored and transmitted as a component of sensor data transmitted to a remote device as described above with respect to FIG. 4. Exemplary methods for using such cached data are described further below with respect to FIG. 14.

Exemplary Depiction of a Multi-User Virtual Environment

Figure 9:
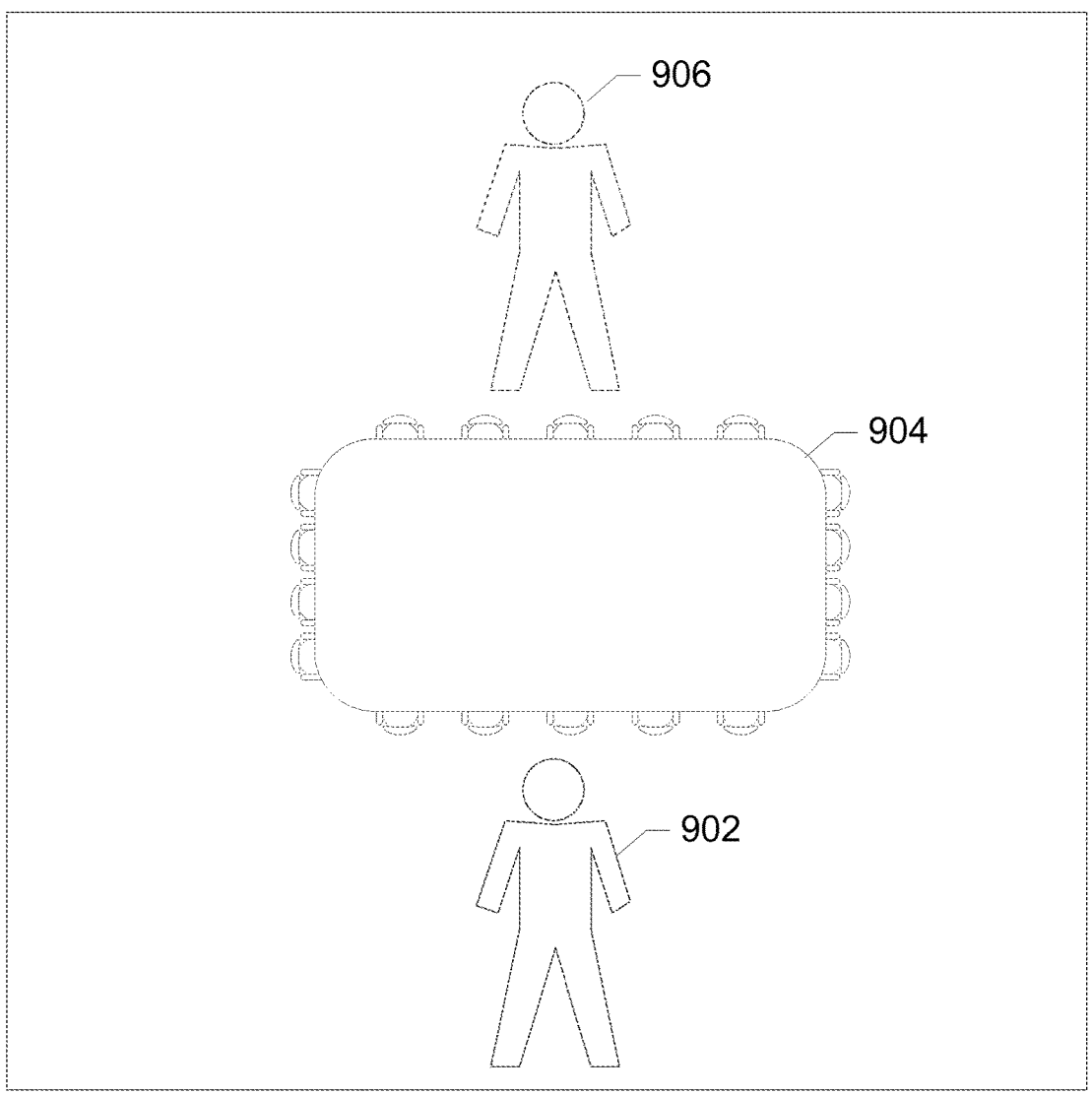
FIG. 9 is a block diagram illustrating an exemplary virtual environment incorporating both a local user and a user reconstructed from received sensor data in accordance with exemplary embodiments of the present invention.

FIG. 9 depicts an exemplary representation of a multi-user virtual environment 900 in accordance with embodiments of the present invention. The multi-user virtual environment 900 includes a local user 902, one or more virtual objects 904 (in this context, a virtual meeting table), and a representation of a remote user 906. The representation of the remote user 906 may be generated based on sensor data received from a device associated with the remote user 906. The representation of the remote user 906 may be positioned and displayed such that it appears that the remote user 906 is located in the same physical environment as the local user 902. Similarly, on the remote user's display, the local user 902 may be displayed as if the local user is in the remote user's physical environment. The virtual objects 904 may be visible to both users as well. The relative positioning of the users and virtual objects to one another may be controlled by a virtual environment engine that determines the coordinate positions and orientations of each user and any displayed virtual objects. In some embodiments, the sensor data received from the remote device may need to be calibrated or offset to correctly position the remote user. For example, if the remote sensor is placed at a lower viewing angle than the local sensor, if the data is not calibrated the remote user may appear to be above the floor of the local user's physical environment. The sensor data provided by the remote device may include data sufficient to calibrate the sensor data to the joint virtual environment experienced by both users. For example, the remote sensor may include one or more accelerometers or gyroscopes to indicate a viewing angle, orientation, and the like, and such data may be transmitted as part of the transmitted sensor data.

Exemplary Data Structure for Transmission of Sensor Data

Figure 10:
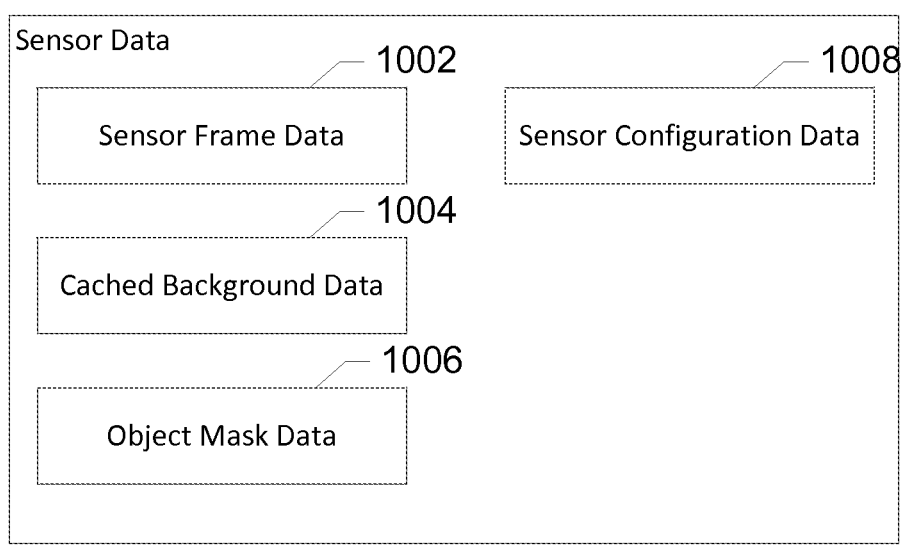
FIG. 10 is a block diagram illustrating an exemplary data structure for storing sensor data in accordance with exemplary embodiments of the present invention.

FIG. 10 illustrates an exemplary data structure 1000 for storage and transmission of sensor data in accordance with some embodiments of the present invention. The data structure 1000 includes sensor frame data 1002, cached background data 1004, object mask data 1006, and sensor configuration data 1008. The sensor frame data 1002 may include raw or processed frame data received from a sensor. For example, the sensor frame data 1002 may be expressed as a bitmap with pixels of the bitmap corresponding to particular portions of a physical environment. Values associated with each pixel (e.g., an intensity value) may indicate the likelihood that an object is present at the physical location corresponding to that particular pixel or an estimated distance between the sensor and an object at each physical location. As noted above, the size of the frame of sensor data may be dynamically configurable to reduce the amount of data transmitted over the network. To this end, the sensor frame data 1002 may also include data indicating the size of the sensor frame and an indication of which edges of the sensor frame, if any, were truncated or cropped. Portions of the sensor frame indicated as truncated or cropped may be assumed to be associated with zero values or otherwise not include any detected objects.

The cached background data 1004 may include data related to objects that were previously detected by the sensor and cached, but which cannot be currently detected, such as due to the orientation of the sensor (e.g., where the sensor pans along one or more axes), or due to occlusion of the cached object.

The object mask data 1006 may include data indicating which pixels or ranges of pixels of the sensor frame data 1002 relate to particular objects of interest (e.g., a user or input device).

The sensor configuration data 1008 may include data related to the orientation, capture settings, size, location, or other parameters of the sensor that captured the data. For example, the sensor configuration data may include gain settings, degrees of orientation relative to the floor, the resolution of the buffer that captured the frame data, or any other parameters relevant to the scenario in which the sensor data was captured.

The data structure 1000 may be generated in a form suitable for transmission over a network, or the data structure 1000 may be provided to another element (e.g., a network interface) to be packetized and transmitted. The data structure 1000 may include multiple buffers for storing the different types of data 1002-1008. In some embodiments, the data structure 1000 is compressed after being assembled. The data structure 1000 may be transmitted as a single block, or it may be packetized according to various network transmission methods and protocols.

It should be appreciated that the types of data described with respect to the data structure 1000 are not intended to be limiting, and that the data structure may also include other data types. For example, some embodiments of the data structure 1000 may also include joint data or other anatomical elements associated with particular users as derived from analysis of the sensor data.

In some embodiments, different types of data are transmitted at different intervals, such that some transmitted sets of sensor data lack one or more of the types of sensor data described above. For example, cached background data 1004 may be transmitted less frequently than frames of sensor data based on the fact that such cached background data 1004 is less likely to change on a frame-by-frame basis.

Exemplary Computer-Implemented Methods for Implementing a Multi-User Virtual Reality Environment FIGS. 11-15 depict exemplary computer-implemented processes that serve to implement a multi-user environment in accordance with exemplary embodiments. These processes may be implemented by computing devices, such as the server 102 depicted with respect to FIG. 1, the apparatus 200 depicted with respect to FIG. 2, and the local device 402 and the remote device depicted with respect to FIG. 4.

Figure 11:
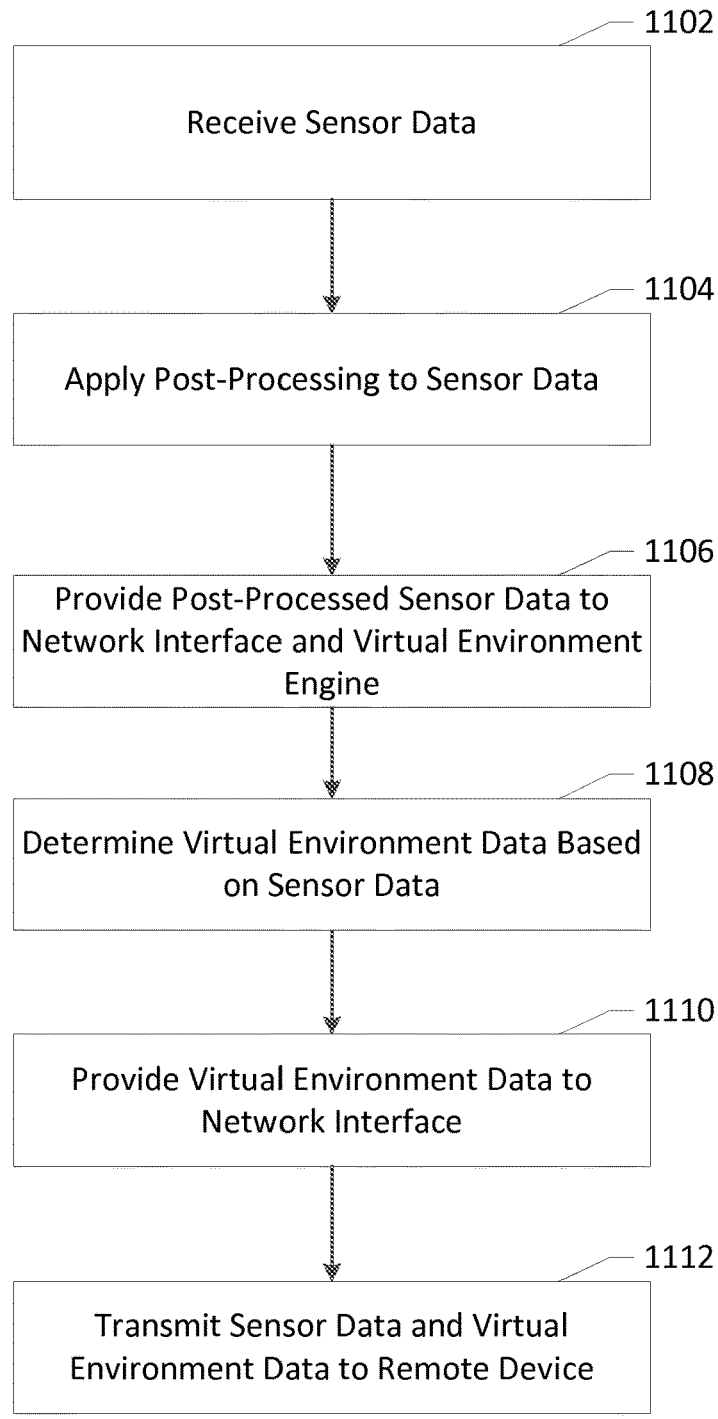
FIG. 11 is a flowchart illustrating an exemplary computer-executable method for transmitting data to enable a multiplayer virtual reality environment in accordance with exemplary embodiments of the present invention.

FIG. 11 is a flowchart depicting an exemplary computer-executable process 1100 for capturing sensor data and transmitting the captured sensor data to a remote device along with virtual environment data. The process 1100 illustrates how a given device is capable of generating sensor data and virtual environment data and transmitting that data to a remote device over a network.

At action 1102, the process receives a set of sensor data as described above with respect to FIGS. 1-10. It should be appreciated that, while the set of sensor data is generally received directly from a particular sensor, in some embodiments the set of sensor data may be received from another device or interface (e.g., in the case where the device executing the process 1100 is operating as a middle-man or go-between for another device).

At action 1104, embodiments may provide post-processing to the sensor data. As indicated above, post-processing may include a variety of filtering, smoothing, and analysis techniques, such as bilateral filtering, Gaussian blurring, temporal filtering, or the like. Such post-processing techniques may reduce noise in the sensor data and improve the detection of objects within the sensor data. Post-processing may also include cropping and/or compression of the data, such as described above with respect to FIGS. 7-8. Exemplary operations for providing compressed sensor data are described further below with respect to FIG. 13.

At action 1106, the post-processed sensor data is provided to both a network interface and a virtual environment engine. At action 1108, the post-processed sensor data is used by the virtual environment engine to update a virtual environment managed by the virtual environment engine and to generate virtual environment data describing the state of the virtual environment. For example, the sensor data may identify one or more game engine events in the virtual environment. At action 1110, the virtual environment data is also provided to the network interface.

At action 1112, the post-processed sensor data and the virtual environment data are transmitted to the remote device. As described above, the post-processed sensor data and the virtual environment data may be transmitted separately or via the same network connection to the remote device.

Figure 12:
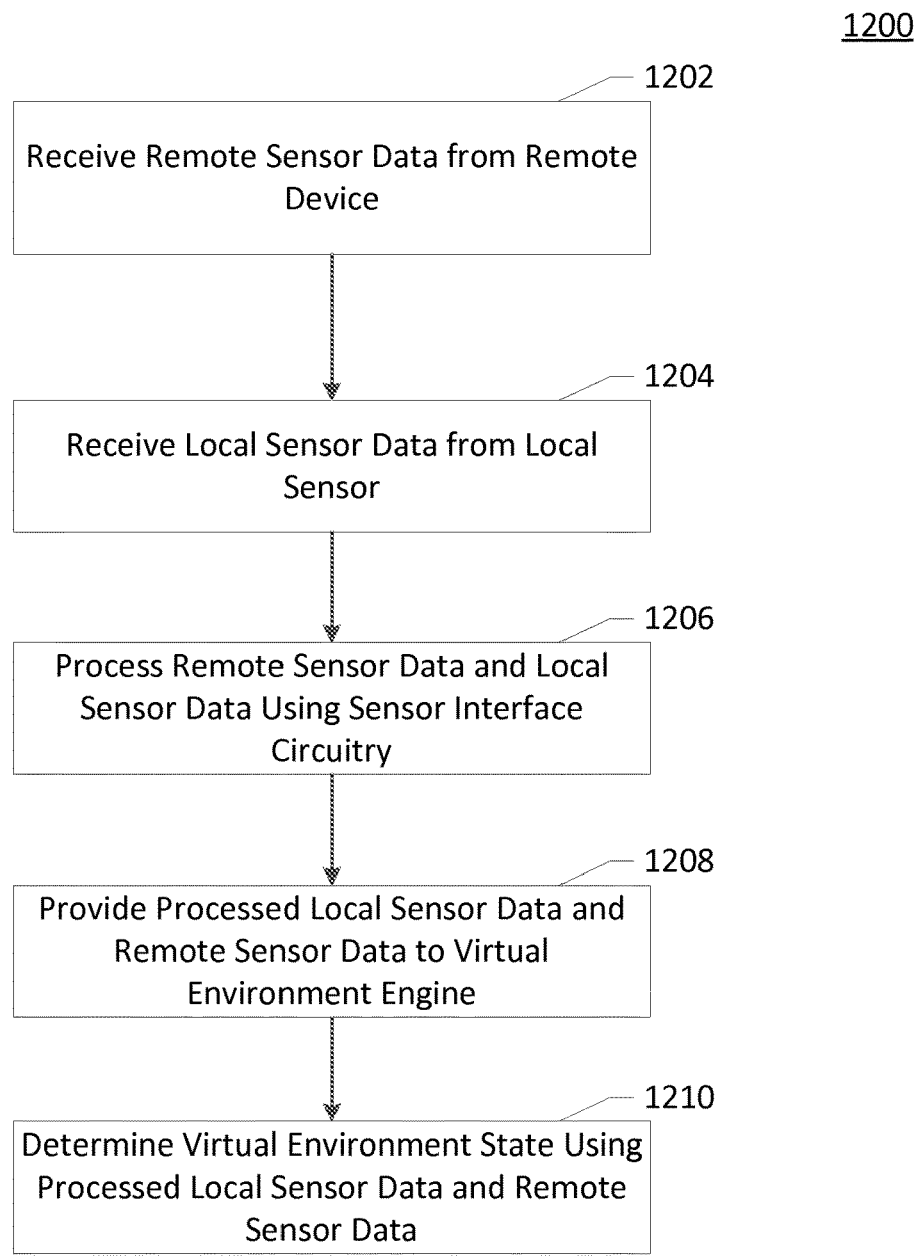
FIG. 12 is a flowchart illustrating an exemplary computer-executable method for receiving data to enable a multiplayer virtual reality environment in accordance with exemplary embodiments of the present invention.

FIG. 12 depicts an exemplary computer-executable process 1200 for receiving sensor data from a remote device and using the sensor data to implement a multi-user virtual environment on a local machine in conjunction with virtual environment data. At action 1202, the process receives remote sensor data from a remote device, such as the sensor data transmitted during execution of the process 1100 described above with respect to FIG. 11. At action 1204, the process receives local sensor data from a local sensor coupled to the device executing the process. It should be readily apparent that in some embodiments, such as where the process is executed on a server computer without a specific user being local to the server, that some embodiments may not actually receive local data, though for the purposes of this explanation the process will be described as having access to both remote sensor data and sensor data generated locally.

At action 1206, the local sensor data and the remote sensor data are both processed using sensor interface circuitry of the device executing the process 1200. At action 1208, the local sensor data and the remote sensor data is provided to a local virtual environment engine. At action 1210, the local virtual environment engine determines a state of a virtual environment using both the local sensor data and the remote sensor data.

Figure 13:
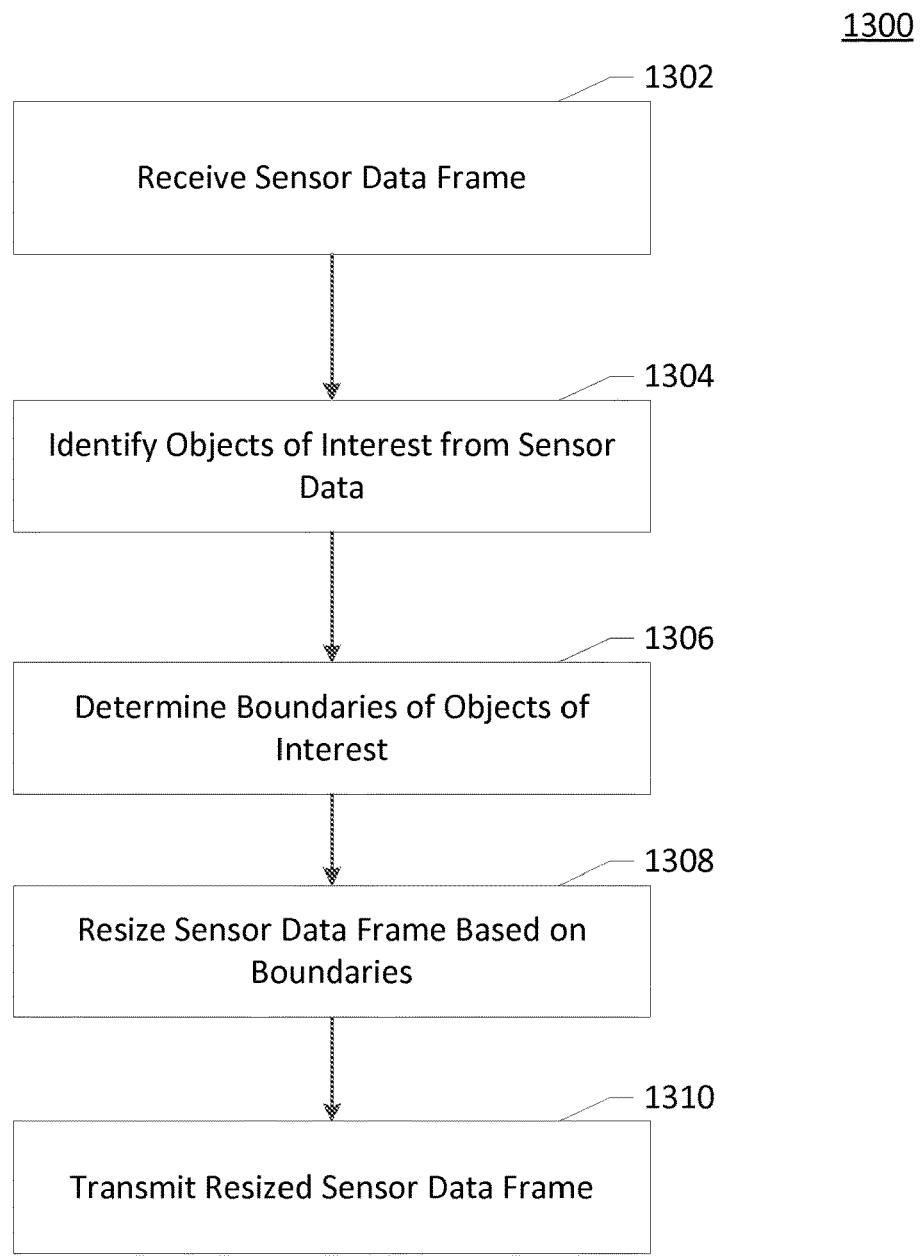
FIG. 13 is a flowchart illustrating an exemplary computer-executable method for reducing the size of a transmitted frame of sensor data in accordance with exemplary embodiments of the present invention.

FIG. 13 depicts an exemplary computer-executable process 1300 for resizing or cropping a frame of sensor data in accordance with embodiments of the present invention. As described above with respect to FIGS. 5-6, embodiments may reduce the amount of data included in network data transmissions of sensor data by reducing the size of a given frame of sensor data. The process 1300 describes one way to perform such a cropping operation.

At action 1302, a frame of sensor data is received. As indicated above, the frame of sensor data may include a series of pixels that indicate the likelihood that an object is present at a particular location or the measured depth of an object at a particular location (e.g., where the sensor is a "depth map").

At action 1304, objects of interest are identified within the frame of sensor data. At action 1306, boundaries for those objects of interest are determined. At action 1308, the sensor data frame is resized based on those boundaries. For example, the frame of sensor data may be cropped such that regions defined between the outer edges of the frame of data and the boundaries of any identified objects are removed from the frame of sensor data. At action 1310, the resized frame of sensor data is transmitted with the cropped portions omitted, thus reducing the size of the transmitted data.

Figure 14:
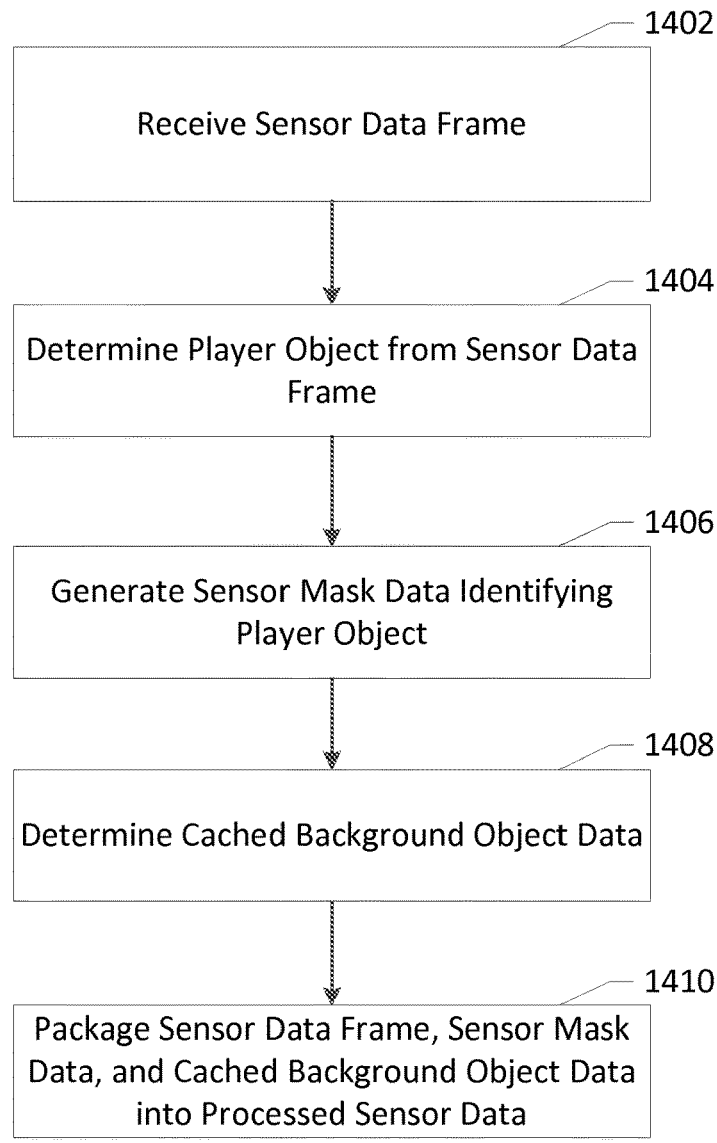
FIG. 14 is a flowchart illustrating an exemplary computer-executable method for creating a data structure for transmission of virtual reality environment information in accordance with exemplary embodiments of the present invention.

FIG. 14 depicts an exemplary computer-executable process 1400 for packaging sensor data for transmission. As noted above with respect to FIG. 10, an exemplary data structure for transmitting sensor data may include sensor frame data, mask data, cached background object data, and sensor configuration data. The process 1400 illustrates one exemplary manner of gathering this data and packaging it into a format suitable for transmission At action 1402, a frame of sensor data is received. At action 1404, a player object or other object of interest (e.g., a user input device, an object identified for calibration, or some other particular object) is identified. The object of interest may be identified according to various techniques as known in the art, such as through the use of infrared beacons, based on detection of movement, based on correspondence to known anatomical structures, or the like. At action 1406, a set of mask data is generated identifying the object. The mask may take the form of a bitmap corresponding to the sensor data. Values of pixels in the bitmap may correspond to particular players or other objects included in the sensor data. For example, if the mask is in the form of an 8-bit bitmap, a value of 0 may indicate a background pixel, a value of 1-6 may indicate a player identifier (e.g., player 1-player 6), and a value of 7 may indicate an error state or an otherwise invalid condition for that pixel.

At action 1408, cached background data is determined. Determination of the cached background data may include identification of objects that were previously present in one or more previous frames but are now occluded, identification of objects other than a user, identification of objects that are not moving, identification of objects outside of a particular region of interest, or the like. At action 1410, the sensor data frame, the sensor mask data, and the cached background object data are packaged into a set of sensor data for transmission to a remote computer.

Figure 15:
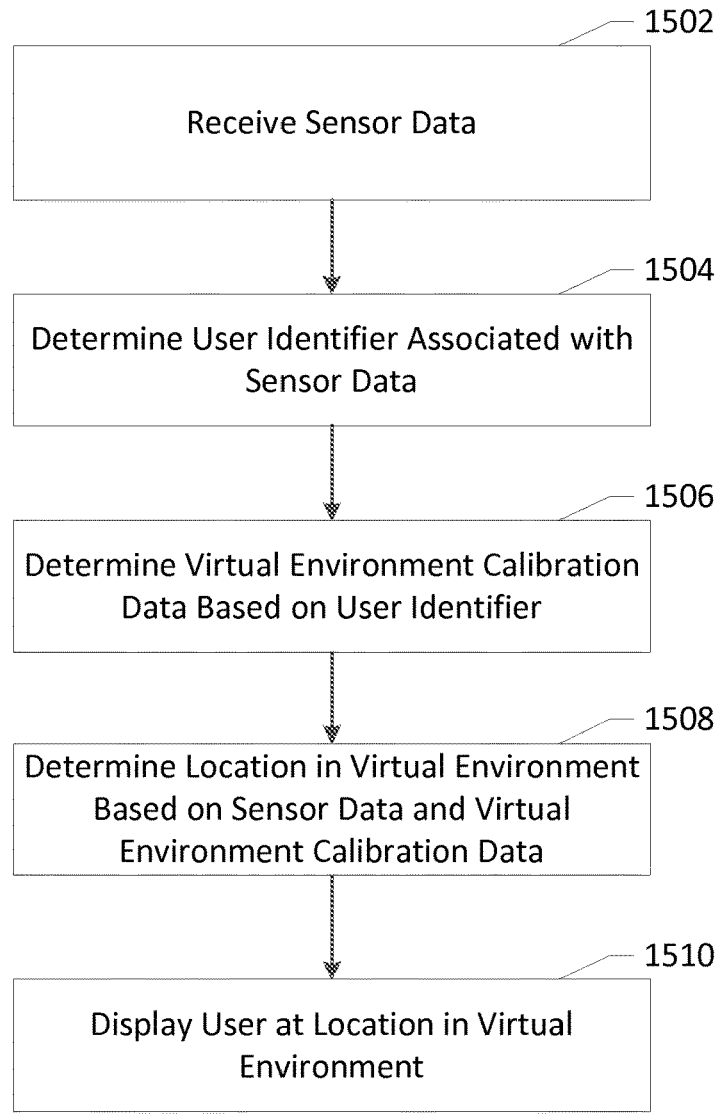
FIG. 15 is a flowchart illustrating an exemplary computer-executable method for generating a multi-user virtual environment in accordance with exemplary embodiments of the present invention.

FIG. 15 is a flowchart illustrating an exemplary computer-executable process 1500 for generating a multi-user virtual environment based on sensor data received from a remote computer. As noted above with respect to FIG. 9, generation of the virtual environment may include determining a relative positioning of users based on the sensor data received for each user. For example, display of a remote user in the virtual environment may require calibrating remote sensor data and local sensor data to ensure a consistent display of each user. The process 1500 illustrates one embodiment that serves to calibrate remote data for display in conjunction with local data.

At action 1502, a set of sensor data is received. At action 1504, the process determines a particular user associated with the set of sensor data. As noted above, a given set of sensor data may include metadata identifying the source or user associated with the particular set of sensor data. At action 1506, a set of virtual environment calibration data associated with the user is determined. For example, a virtual environment engine may identify particular starting locations or positions within the virtual environment for association with particular users or players (e.g., player 1 starts at a first set of coordinates, and player 2 starts as a second set of coordinates). In some embodiments, particular coordinates within the virtual environment are mapped to physical coordinates visible to sensors on each user's local computer. As such, each separate computer may include a mapping to the set of virtual coordinates, allowing each user to move throughout the virtual environment. In some embodiments, some or all of the virtual environment calibration data may be received from the sensor as part of the sensor data. For example, calibration data may include an angle of the sensor relative to the floor of the user's physical environment as derived from an internal gyroscope of the sensor.

At action 1508, a location within the virtual environment is determined based on the sensor data and the virtual environment calibration data. At action 1510, the user is associated and displayed at that particular virtual location, such that the user appears at that location for each user interfacing with the multi-user virtual environment. It should be readily appreciated that the process 1500 may be repeated for any number of users, with different users being associated with different locations within the virtual environment. It should also be appreciated that display of users at particular locations may include a virtual representation of the sensor data in an effort to mimic the physical appearance, shape, size, or the like of the user of each device.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by $\frac{1}{20}$th, $\frac{1}{10}$th, $\frac{1}{5}$th, $\frac{1}{3}$rd, $\frac{1}{2}$nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for implementing a multi-user virtual reality environment, the method comprising:

receiving sensor data from a sensor at a local device;

providing the sensor data to a network interface for electronic transmission to a remote device;

electronically transmitting, using the network interface and via a first set of packets explicitly reserved for transmission of only the sensor data, the sensor data to the remote device for use in generating a multi-user virtual environment, wherein electronically transmitting the sensor data via the first set of packets explicitly reserved for transmission of the sensor data enables faster updating of a display of the remote device;

providing the sensor data to a virtual environment engine executing on a processor of the local device;

determining, by the virtual environment engine and based at least in part on the sensor data, virtual environment data related to a virtual reality environment, the virtual environment data being separate from and exclusive of the sensor data;

separately from providing the sensor data to the network interface, providing the virtual environment data to the network interface for electronic transmission to the remote device;
electronically transmitting, using the network interface and via a second set of packets explicitly reserved for transmission of virtual environment data, the virtual environment data to the remote device for use in generating the multi-user virtual environment, wherein electronically transmitting the virtual environment data via the second set of packets explicitly reserved for transmission of the virtual environment data further enables faster updating of the display of the remote device; and
providing the sensor data to another local device to verify a legitimacy of any actions indicated in the virtual environment data,
wherein:
the sensor data is transmitted at a first interval and the virtual environment data is transmitted at a second interval, the second interval being different than the first interval,
the sensor data and the virtual environment data are separately transmitted via different sockets,
the sensor data comprises at least one frame of data received from a sensor, and
the sensor data further comprises a set of mask data identifying one or more pixels within the at least one frame of data that are associated with at least one object.

2. The method of claim 1, wherein the network interface comprises at least two separate network connections to the remote device, and wherein each of the sensor data and the virtual environment data is transmitted via a different connection of the at least two separate network connections.

3. The method of claim 1, further comprising post-processing the sensor data prior to transmission to the remote device.

4. The method of claim 3, wherein post-processing comprises at least one of filtering the sensor data, smoothing the sensor data, cropping the sensor data, or identifying the presence of at least one object within the sensor data.

5. The method of claim 1, wherein the sensor data further comprises cached background data identifying the presence of at least one object not visible within the at least one frame of data.

6. A computer-implemented method for implementing a multi-user virtual reality environment, the method comprising:
receiving, at a local sensor interface and via a first set of packets explicitly reserved for transmission of sensor data, only a first set of sensor data from a remote device via a network interface, the first set of sensor data being received at a first interval;
receiving a second set of sensor data from a local sensor by the local sensor interface;
providing, by the local sensor interface, the first set of sensor data and the second set of sensor data to a local virtual environment engine executing on a processor;
receiving, by the local virtual environment engine and via a second set of packets explicitly reserved for transmission of virtual environment data, a set of virtual environment data from the remote device via the network interface, wherein the first set of sensor data and the set of virtual environment data are received via different sockets, and wherein the set of virtual environment data is separate from and exclusive of the first and second sets of sensor data;
generating a multi-user virtual environment based in least in part on both the first set of sensor data and the second set of sensor data;
providing instructions to a display device to display at least a portion of the multi-user virtual environment, wherein receipt of the first set of sensor data via the first set of packets explicitly reserved for transmission of only the sensor data at a first interval and receipt of the set of virtual environment data via the second set of packets explicitly reserved for transmission of the virtual environment data at a second interval different than the first interval enables faster updating of the display device;
verifying the set of virtual environment data based at least in part using the first set of sensor data; and
reconstructing an appearance of a user from another remote device based at least in part using portions of the first and the second sets of sensor data that capture at least a position, size, and shape of the user.

7. The method of claim 6, further comprising:
using the first set of sensor data to generate a virtual representation of a user of the remote device; and
presenting the virtual representation of the user of the remote device within the multi-user virtual environment.

8. The method of claim 6, wherein the first set of sensor data further comprises object mask data, and the method comprises determining a presence of a use of the remote device within the first set of sensor data based at least in part on the object mask data.

9. The method of claim 6, further comprising applying at least one post-processing operation to the second set of sensor data, but not the first set of sensor data.

10. The method of claim 9, wherein the first set of sensor data comprises at least one parameter indicating the first set of sensor data was post-processed prior to receipt by the local sensor interface.

11. The method of claim 6, wherein the display device is a head-mounted display.

12. A system for implementing a multi-user virtual reality environment, the system comprising:
sensor interface circuitry configured to:
receive sensor data from a sensor at a local device;
provide the sensor data to a network interface for electronic transmission to a remote device; and
provide the sensor data to a virtual environment engine executing on a processor of the local device;
virtual environment state management circuitry configured to:
determine, based at least in part on the sensor data, virtual environment data related to a virtual reality environment, the virtual environment data being separate from and exclusive of the sensor data; and
separately from providing the sensor data to the network interface, provide the virtual environment data to the network interface for electronic transmission to the remote device; and
the network interface, which is configured to:
electronically transmit, via a first set of packets explicitly reserved for transmission of only the sensor data, the sensor data to the remote device for use in generating a multi-user virtual environment, wherein electronic transmission the sensor data via the first set of packets explicitly reserved for transmission of the sensor data enables faster updating of a display of the remote device;

electronically transmit, via a second set of packets explicitly reserved for transmission of virtual environment data, the virtual environment data to the remote device for use in generating the multi-user virtual environment, wherein electronic transmission of the virtual environment data via the second set of packets explicitly reserved for transmission of the virtual environment data further enables faster updating of the display of the remote device; and provide the sensor data to another local device to verify a legitimacy of any actions indicated in the virtual environment data, wherein:
the sensor data is transmitted at a first interval and the virtual environment data is transmitted at a second interval, the second interval being different than the first interval, the network interface is configured to transmit the sensor data and the virtual environment data via different sockets, the sensor data comprises at least one frame of data received from a sensor, and the sensor data further comprises a set of mask data identifying one or more pixels within the at least one frame of data that are associated with at least one object.

13. The system of claim 12, wherein the network interface comprises at least two separate network connections to the remote device, and wherein each of the sensor data and the virtual environment data is transmitted via a different connection of the at least two separate network connections.

14. The system of claim 12, wherein the sensor interface circuitry is further configured to post-process the sensor data prior to transmission to the remote device.

15. The system of claim 12, wherein the sensor data further comprises cached background data identifying the presence of at least one object not visible within the at least one frame of data.

16. The system of claim 12, wherein the sensor data further comprises sensor configuration data indicating at least one configuration parameter of the sensor.

17. A system for implementing a multi-user virtual reality environment, the system comprising:

sensor interface circuitry configured to:
receive a first set of sensor data from a remote device via a network interface and via a first set of packets explicitly reserved for transmission of sensor data the first set of sensor data being received at a first interval;

receive a second set of sensor data from a local sensor; and provide the first set of sensor data and the second set of sensor data to a local virtual environment engine executing on a processor; and virtual environment state management circuitry configured to:
generate a multi-user virtual environment based in least in part on both the first set of sensor data and the second set of sensor data;

provide instructions to a display device to display at least a portion of the multi-user virtual environment, wherein receipt of the first set of sensor data via the first set of packets explicitly reserved for transmission of only the sensor data enables faster updating of the display device;

receive a set of virtual environment data from the remote device via the network interface and via a second set of packets explicitly reserved for transmission of virtual environment data, wherein receipt of the virtual environment data via the second set of packets explicitly reserved for transmission of the virtual environment data further enables faster updating of the display device, wherein the virtual environment data is separate from and exclusive of the first and second sets of sensor data, wherein the set of virtual environment data is received at a second interval different than the first interval, and wherein the first set of sensor data and the set of virtual environment data are received via different sockets;

verify the set of virtual environment data based at least in part using the first set of sensor data; and reconstruct an appearance of a user from another remote device based at least in part using portions of the first and the second sets of sensor data that capture at least a position, size, and shape of the user.

18. The system of claim 17, wherein the virtual environment state management circuitry is further configured to:

use the first set of sensor data to generate a virtual representation of a user of the remote device; and present the virtual representation of the user of the remote device within the multi-user virtual environment.

19. The system of claim 17, wherein the sensor interface circuitry is further configured to apply at least one post-processing operation to the second set of sensor data, but not the first set of sensor data.

20. The system of claim 17, wherein the display device is a head-mounted display.

* * * * *